United States Patent
Aiken, Jr. et al.

(10) Patent No.: US 6,954,784 B2
(45) Date of Patent: Oct. 11, 2005

(54) SYSTEMS, METHOD AND COMPUTER PROGRAM PRODUCTS FOR CLUSTER WORKLOAD DISTRIBUTION WITHOUT PRECONFIGURED PORT IDENTIFICATION BY UTILIZING A PORT OF MULTIPLE PORTS ASSOCIATED WITH A SINGLE IP ADDRESS

(75) Inventors: John Andrew Aiken, Jr., Raleigh, NC (US); Alfred Bundgaard Christensen, Raleigh, NC (US); David Anthony Herr, Apex, NC (US); Mark W. McClintock, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 10/087,853

(22) Filed: Mar. 4, 2002

(65) Prior Publication Data

US 2002/0124089 A1 Sep. 5, 2002

Related U.S. Application Data

(63) Continuation-in-part of application No. 09/862,968, filed on May 22, 2001, and a continuation-in-part of application No. 09/640,409, filed on Aug. 17, 2000.

(51) Int. Cl.[7] .............................................. G06F 15/177
(52) U.S. Cl. ..................... 709/220; 709/238; 709/239
(58) Field of Search ................................. 709/225, 227, 709/238, 239, 328, 220; 370/469; 713/201

(56) References Cited

U.S. PATENT DOCUMENTS

| | | | | |
|---|---|---|---|---|
| 4,403,286 A | 9/1983 | Fry et al. | ..................... | 364/200 |
| 4,495,570 A | 1/1985 | Kitajima et al. | ............ | 364/200 |
| 4,577,272 A | 3/1986 | Ballew et al. | .............. | 364/200 |
| 5,031,089 A | 7/1991 | Liu et al. | .................... | 364/200 |
| 5,341,477 A | 8/1994 | Pitkin et al. | ................. | 395/200 |
| 5,537,542 A | 7/1996 | Eilert et al. | ............ | 395/184.01 |
| 5,563,878 A | 10/1996 | Blakeley et al. | .............. | 370/60 |
| 5,603,029 A | 2/1997 | Aman et al. | ................. | 395/675 |
| 5,675,739 A | 10/1997 | Eilert et al. | ................. | 395/200 |
| 5,740,371 A | 4/1998 | Wallis | .................... | 395/200.59 |
| 5,754,752 A | 5/1998 | Sheh et al. | ............ | 395/182.02 |
| 5,774,660 A | 6/1998 | Brendel et al. | ........ | 395/200.31 |
| 5,774,668 A | 6/1998 | Choquier et al. | ...... | 395/200.53 |
| 5,796,936 A | 8/1998 | Watabe et al. | ......... | 395/182.09 |
| 5,812,771 A | 9/1998 | Fee et al. | .............. | 395/200.31 |

(Continued)

FOREIGN PATENT DOCUMENTS

EP          0648038 A2    4/1995

OTHER PUBLICATIONS

U.S. Appl. No. 09/693,663, filed Oct. 20, 2000.
U.S. Appl. No. 09/693,027, filed Oct. 20, 2000.
A. Dahlin, et al. *EDDIE A Robust and Scalable Internet Server.* Ericsson Telecom AB, Stockholm, Sweden, pp. 1–7 (May 1998).

*Primary Examiner*—Le Hien Luu
(74) *Attorney, Agent, or Firm*—Myers Bigel Sibley & Sajovec

(57) ABSTRACT

Cluster-wide port assignments in a workload distribution system in a cluster of data processing systems are provided such that a unique port may be provided for a socket. Establishing ports associated with workload distribution is also provided by allowing either enumerated ports and/or all ports of a common IP address to be associated with workload distribution. Workload distribution is provided in a cluster of data processing systems where a single IP address may be associated with a plurality of data processing systems and/or protocol stacks in the cluster of data processing systems and a port of the single IP address may be shared among multiple data processing systems and/or protocol stacks or may be unique among the plurality of data processing systems and/or protocol stacks.

27 Claims, 15 Drawing Sheets

U.S. PATENT DOCUMENTS

| | | | | |
|---|---|---|---|---|
| 5,828,847 | A | 10/1998 | Gehr | 395/200.69 |
| 5,867,636 | A | 2/1999 | Walker | 395/114 |
| 5,867,661 | A | 2/1999 | Bittinger et al. | 709/227 |
| 5,917,997 | A | 6/1999 | Bell et al. | 395/182.02 |
| 5,918,017 | A | 6/1999 | Attanasio et al. | 395/200.54 |
| 5,923,854 | A | 7/1999 | Bell et al. | 395/200.73 |
| 5,935,215 | A | 8/1999 | Bell et al. | 709/239 |
| 5,941,988 | A | 8/1999 | Bhagwat et al. | 713/201 |
| 5,946,686 | A | 8/1999 | Schmuck et al. | 707/10 |
| 5,951,650 | A | 9/1999 | Bell et al. | 709/238 |
| 5,951,694 | A | 9/1999 | Choquier et al. | 714/15 |
| 6,031,978 | A | 2/2000 | Cotner et al. | 395/200.78 |
| 6,119,174 | A | 9/2000 | Borowsky et al. | 710/15 |
| 6,128,279 | A | 10/2000 | O'Neil et al. | 370/229 |
| 6,141,759 | A | 10/2000 | Braddy | 713/201 |
| 6,223,205 | B1 | 4/2001 | Harchol-Balter et al. | 709/105 |
| 6,247,057 | B1 | 6/2001 | Barrera, III | 709/229 |
| 6,252,878 | B1 | 6/2001 | Locklear et al. | 370/401 |
| 6,286,039 | B1 | 9/2001 | Van Horne et al. | 709/221 |
| 6,314,463 | B1 | 11/2001 | Abbott et al. | 709/224 |
| 6,317,786 | B1 | 11/2001 | Yamane et al. | 709/224 |
| 6,330,560 | B1 | 12/2001 | Harrison et al. | 707/8 |
| 6,363,081 | B1 | 3/2002 | Gase | 370/466 |
| 6,374,300 | B2 | 4/2002 | Masters | 709/202 |
| 6,430,622 | B1 | 8/2002 | Aiken, Jr. et al. | 709/245 |
| 6,445,704 | B1 | 9/2002 | Howes et al. | 370/392 |
| 6,446,225 | B1 | 9/2002 | Rohsman et al. | 714/55 |
| 6,542,926 | B2 | 4/2003 | Zalewski et al. | 709/213 |
| 6,578,066 | B1 | 6/2003 | Logan et al. | 709/105 |
| 6,587,866 | B1 | 7/2003 | Modi et al. | 709/108 |
| 6,591,262 | B1 | 7/2003 | Maclellan et al. | 707/2 |
| 6,594,268 | B1 | 7/2003 | Aukia et al. | 370/400 |
| 6,606,315 | B1 | 8/2003 | Albert et al. | 370/352 |
| 6,650,641 | B1 | 11/2003 | Albert et al. | 370/392 |
| 6,657,974 | B1 | 12/2003 | Britton et al. | 370/216 |
| 6,701,377 | B2 | 3/2004 | Burmann et al. | 709/249 |
| 6,704,317 | B1 | 3/2004 | Dobson | 370/401 |
| 6,718,383 | B1 | 4/2004 | Hebert | 709/224 |
| 2002/0010783 | A1 | 1/2002 | Primak et al. | 709/228 |
| 2002/0091831 | A1 | 7/2002 | Johnson | 709/227 |
| 2002/0143953 | A1 * | 10/2002 | Aiken, Jr. | 709/227 |
| 2002/0143954 | A1 * | 10/2002 | Aiken et al. | 709/227 |
| 2002/0166080 | A1 | 11/2002 | Attanasio et al. | 714/15 |
| 2002/0178265 | A1 | 11/2002 | Aiken, Jr. et al. | 709/227 |
| 2002/0178268 | A1 | 11/2002 | Aiken, Jr. et al. | 709/228 |
| 2002/0199000 | A1 * | 12/2002 | Banerjee | 709/227 |
| 2003/0061402 | A1 * | 3/2003 | Yadav | 709/328 |
| 2003/0079146 | A1 * | 4/2003 | Burstein | 713/201 |
| 2003/0202536 | A1 * | 10/2003 | Foster et al. | 370/469 |

OTHER PUBLICATIONS

Brochure entitled, *ACEdirector™ 8–Port 10/100 MBPS Ethernet Switch.* Alteon WebSystems, San Jose, CA (1999).

Brochure entitled, *Enhancing Web User Experience with Global Server Load Balancing.* Alteon WebSystems, San Jose, CA (Jun. 1999).

Brochure entitled, *The Next Step in Server Load Balancing.* Alteon WebSystems, San Jose, CA (Nov. 1999).

Mac Devine. Presentation entitled, *TCP/IP Application Availability and Workload Balancing in the Parallel Sysplex.* Share Technical Conference (Aug. 22–27, 1999).

http://w3.enterlib.ibm.com:80/cgi–bin/bookmgr/books/F1AF7001/1.3.1.2; 1.3.1.2.5 Virtual IP Addressing (VIPA); Excerpt from IP Configuration for OS/390, pp. 1–4 (1998).

http://w3.enterlib.ibm.com:80/cgi–bin/bookmgr/books/F1AF7001/1.3.2; 1.3.20 DEVICE and LINK Statement— Virtual Devices (VIPA); Excerpt from IP Configuration for OS/390, pp. 1–3 (1998).

http://w3.enterlib.ibm.com:80/cgi–bin/bookmgr/books/F1AF7001/1.3.2; 1.3.23. HOME Statement; Excerpt from IP Configuration for OS/390, pp. 1–6 (1998).

Pai et al. *Locality–Aware Request Distribution in Cluster–based Network Servers.* Proceedings of the $8^{th}$ International Conference on Architectural Support for Programming Languages and Operating Systems (ASPLOS VIII), San Jose, CA, Oct., 1998.

Aron et al. "Scalable Content–aware Request Distribution in Cluster–based Network Servers." Proc. of the 2000 Annual Usenix Technical Conference, San Diego, CA, Jun. 2000.

Aron et al. "Efficient Support for P–HTTP in Cluster–Based Web Servers." Proc. of 1999 Annual Usenix Technical Conference, Monterey, CA, Jun. 1999.

Aron, Mohit. "Scalable Content–aware Request Distribution in Cluster–based Network Servers." http://softlib.rice.edu/softlib/scalableRD.html. Department of Computer Science, Rice University.

"Data Communications Awards Allot Communications 'Hot Product' in Internetworking/IP Tools Category." Press Bulletin. Los Gatos, CA, Jan. 18, 1999.

"Allot Introduces Turnkey Next Generation IP SErvice and Creation Solution—the Virtual Bandwidth Manager." Press Bulletin. Atlanta, GA, SUPERCOMM 2000, Booth #8458, Jun. 5, 2000.

"Allot Announces the General Availability of its Directory Services–Based NetPolicy™ Manager." Press Bulletin. Tel Aviv, Israel, Feb. 28, 2000.

"Allot Communications Announces the Netenforcer Family of IP Traffic Management Products: Fault–Tolerant, Scaleable, Policy–Based Bandwidth Management, QOS, SLA Solutions." Press Bulletin. Burlingame, CA, Dec. 13, 1999.

"Allot Communications Announces Business–Aware Network Policy Manager." Press Bulletin. Sophia Antipolis, France, Sep. 20, 1999.

"Allot Communications Announces Directory Services Based Network Policy Manager." Press Bulletin. Los Gatos, CA, Apr. 5, 1999.

"Allot Communications Launches NetEnforcer with NetWizard, the Fastest Way to Implement Accurate and Reliable Network QoS Policies." Press Bulletin. Burlingame, CA, Jan. 25, 2001.

"Policy–Based Network Architecture." from www.allot.com pp. 1–11.

U.S. Appl. No. 09/401,419, entitled, *Methods, Systems and Computer Program Products for Automated Movement of IP Addresses Within a Cluster,* filed Sep. 22, 1999.

U.S. Appl. No. 09/640,412, entitled, *Methods, Systems and Computer Program Products for Non–Disruptively Transferring a Virtual Internet Protocol Address Between Communication Protocol Stacks,* filed Aug. 17, 2000.

U.S. Appl. No. 09/640,409, entitled, *Methods, Systems and Computer Program Products for Cluster Workload Distribution,* filed Aug. 17, 2000.

U.S. Appl. No. 09/640,438, entitled, *Methods, Systems and Computer Program Products for Failure Recovery of Virtual Internet Protocol Addresses,* filed Aug. 17, 2000.

\* cited by examiner

US 6,954,784 B2

SYSTEMS, METHOD AND COMPUTER PROGRAM PRODUCTS FOR CLUSTER WORKLOAD DISTRIBUTION WITHOUT PRECONFIGURED PORT IDENTIFICATION BY UTILIZING A PORT OF MULTIPLE PORTS ASSOCIATED WITH A SINGLE IP ADDRESS

CLAIM OF PRIORITY

The present application is a continuation-in-part of, and claims priority from, U.S. patent application Ser. No. 09/640,409, filed Aug. 17, 2000, and entitled "METHODS, SYSTEMS AND COMPUTER PROGRAM PRODUCTS FOR CLUSTER WORKLOAD DISTRIBUTION" and U.S. patent application Ser. No. 09/862,968, filed May 22, 2001, and entitled "METHODS, SYSTEMS AND COMPUTER PROGRAM PRODUCTS FOR PORT ASSIGNMENTS OF MULTIPLE APPLICATION INSTANCES USING THE SAME SOURCE IP ADDRESS", the disclosures of which are incorporated herein by reference as if set forth fully herein.

FIELD OF THE INVENTION

The present invention relates to network communications and more particularly to network communications with a cluster of data processing systems.

BACKGROUND OF THE INVENTION

The Internet Protocol (IP) is a connectionless protocol. IP packets are routed from originator through a network of routers to the destination. All physical adapter devices in such a network, including those for client and server hosts, are identified by an IP Address which is unique within the network. One valuable feature of IP is that a failure of an intermediate router node or adapter will not prevent a packet from moving from source to destination, as long as there is an alternate path through the network.

In Transmission Control Protocol/Internet Protocol (TCP/IP), TCP sets up a connection between two endpoints, identified by the respective IP addresses and a port number on each. Unlike failures of an adapter in an intermediate node, if one of the endpoint adapters (or the link leading to it) fails, all connections through that adapter fail, and must be reestablished. If the failure is on a client workstation host, only the relatively few client connections are disrupted, and usually only one person is inconvenienced. However, an adapter failure on a server means that hundreds or thousands of connections may be disrupted. On a System/390 with large capacity, the number may run to tens of thousands.

To alleviate this situation, International Business Machines Corporation introduced the concept of a Virtual IP Address, or VIPA, on its TCP/IP for OS/390 V2R5 (and added to V2R4 as well). Examples of VIPAs and their user may be found in U.S. Pat. Nos. 5,917,997, 5,923,854, 5,935,215 and 5,951,650. A VIPA is configured the same as a normal IP address for a physical adapter, except that it is not associated with any particular device. To an attached router, the TCP/IP stack on System/390 simply looks like another router. When the TCP/IP stack receives a packet destined for one of its VIPAs, the inbound IP function of the TCP/IP stack notes the IP address of the packet is in the TCP/IP stack's Home list of IP addresses and passes the packet up the TCP/IP stack. The "home list" of a TCP/IP stack is the list of IP addresses which are "owned" by the TCP/IP stack. Assuming the TCP/IP stack has multiple adapters or paths to it (including a Cross Coupling Facility (XCF) path from other TCP/IP stacks in a Sysplex), if a particular physical adapter fails, the attached routing network will route VIPA-targeted packets to the TCP/IP stack via an alternate route. The VIPA may, thus, be thought of as an address to the stack, and not to any particular adapter.

While the use of VIPAs may remove hardware and associated transmission media as a single point of failure for large numbers of connections, the connectivity of a server can still be lost through a failure of a single stack or an MVS image. The VIPA Configuration manual for System/390 tells the customer how to configure the VIPA(s) for a failed stack on another stack, but this is a manual process. Substantial down time of a failed MVS image or TCP/IP stack may still result until an operator intervenes to manually reconfigure the TCP/IP stacks in a Sysplex to route around the failed TCP/IP stack or MVS image.

While merely restarting an application with a new IP address may resolve many failures, applications use IP addresses in different ways and, therefore, such a solution may be inappropriate. The first time a client resolves a name in its local domain, the local Dynamic Name Server (DNS) will query back through the DNS hierarchy to get to the authoritative server. For a Sysplex, the authoritative server should be DNS/Workload Manager (WLM). DNS/WLM will consider relative workloads among the nodes supporting the requested application, and will return the IP address for the most appropriate available server. IP addresses for servers that are not available will not be returned. The Time to Live of the returned IP address will be zero, so that the next resolution query (on failure of the original server, for example) will go all the way back to the DNS/WLM that has the knowledge to return the IP address of an available server.

However, in practice, things do not always work as described above. For example, some clients are configured to a specific IP address, thus requiring human intervention to go to another server. However, the person using the client may not have the knowledge to reconfigure the client for a new IP address. Additionally, some clients ignore the Time to Live, and cache the IP address as long as the client is active. Human intervention may again be required to recycle the client to obtain a new IP address. Also, DNSs are often deployed as a hierarchy to reduce network traffic, and DNSs may cache the IP address beyond the stated Time to Live even when the client behaves quite correctly. Thus, even if the client requests a new IP address, the client may receive the cached address from the DNS. Finally, some users may prefer to configure DNS/WLM to send a Time to Live that is greater than zero, in an attempt to limit network-wide traffic to resolve names. Problems arising from these various scenarios may be reduced if the IP address with which the client communicates does not change. However, as described above, to affect such a movement of VIPAs between TCP/IP stacks requires operator intervention and may result in lengthy down times for the applications associated with the VIPA.

Previous approaches to increased availability focused on providing spare hardware. The High-Availability Coupled Multi-Processor (HACMP) design allows for taking over the MAC address of a failing adapter on a shared medium (LAN). This works both for a failing adapter (failover to a spare adapter on the same node) or for a failing node (failover to another node via spare adapter or adapters on the takeover node.) Spare adapters are not used for IP traffic, but they are used to exchange heartbeats among cluster nodes for failure detection. All of the work on a failing node goes to a single surviving node. In addition to spare adapters and access to the same application data, the designated failover node must also have sufficient spare processing capacity to handle the entire failing node workload with "acceptable" service characteristics (response and throughput).

Automatic restart of failing applications also provides faster recovery of a failing application or node. This may be acceptable when the application can be restarted in place, but is less useful when the application is moved to another node, unless the IP address known to the clients can be moved with the application, or dynamic DNS updates with alternate IP addresses can be propagated to a DNS local to clients sufficiently quickly.

Other attempts at error recovery have included the EDDIE system described in a paper titled "EDDIE, A Robust and Scalable Internet Server" by A. Dahlin, M. Froberg, J. Grebeno, J. Walerud, and P. Winroth, of Ericsson Telecom AB, Stockholm, Sweden, May 1998. In the EDDIE approach a distributed application called "IP Address Migration Application" controls all IP addresses in the cluster. The cluster is connected via a shared-medium LAN. IP address aliasing is used to provide addresses to individual applications over a single adapter, and these aliases are located via Address Resolution Protocol (ARP) and ARP caches in the TCP/IPs. The application monitors all server applications and hardware, and reallocates aliased IP addresses in the event of failure to surviving adapters and nodes. This approach allows applications of a failing node to be distributed among surviving nodes, but it may require the monitoring application to have complete knowledge of the application and network adapter topology in the cluster. In this sense, it is similar to existing Systems Management applications such as those provided by International Business Machines Corporation's Tivoli® network management software, but the IP Address Migration Application has direct access to adapters and ARP caches. The application also requires a dedicated IP address for inter-application communication and coordination.

U.S. Pat. No. 6,430,622 entitled "METHODS, SYSTEMS AND COMPUTER PROGRAM PRODUCTS FOR AUTOMATED MOVEMENT OF IP ADDRESSES WITHIN A CLUSTER" filed Sep. 22, 1999, the disclosure of which is incorporated herein by reference as if set forth fully herein, describes dynamic virtual IP addresses (VIPA) and their use. As described in the '622 patent, a dynamic VIPA may be automatically moved from protocol stack to protocol stack in a predefined manner to overcome failures of a particular protocol stack (i.e. VIPA takeover). Such a predefined movement may provide a predefined backup protocol stack for a particular VIPA. VIPA takeover was made available by International Business Machines Corporation (IBM), Armonk, N.Y., in OS/390 V2R8 which had a general availability date of September, 1999.

In addition to failure scenarios, scalability and load balancing are also issues which have received considerable attention in light of the expansion of the Internet. For example, it may be desirable to have multiple servers servicing customers. The workload of such servers may be balanced by providing a single network visible IP address which is mapped to multiple servers.

Such a mapping process may be achieved by, for example, network address translation (NAT) facilities, dispatcher systems and IBM's Dynamic Name Server/Workload Management DNS/WLM systems. These various mechanisms for allowing multiple servers to share a single IP address are illustrated in FIGS. 1 through 3.

FIG. 1 illustrates a conventional network address translation system as described above. In the system of FIG. 1, a client 10 communicates over a network 12 to a network address translation system 14. The network address translation system receives the communications from the client 10 and converts the communications from the addressing scheme of the network 12 to the addressing scheme of the network 12' and sends the messages to the servers 16. A server 16 may be selected from multiple servers 16 at connect time and may be on any host, one or more hops away. All inbound and outbound traffic flows through the NAT system 14.

FIG. 2 illustrates a conventional DNS/WLM system as described above. As mentioned above, the server 16 is selected at name resolution time when the client 10 resolves the name for the destination server from DNS/WLM system 17 which is connected to the servers 16 through the coupling facility 19. As described above, the DNS/WLM system of FIG. 2 relies on the client 10 adhering to the zero time to live.

FIG. 3 illustrates a conventional dispatcher system. As seen in FIG. 3, the client 10 communicates over the network 12 with a dispatcher system 18 to establish a connection. The dispatcher routes inbound packets to the servers 16 and outbound packets are sent over network 12' but may flow over any available path to the client 10. The servers 16 are typically on a directly connected network to the dispatcher 18 and a server 16 is selected at connect time.

Such a dispatcher system is illustrated by the Interactive Network Dispatcher function of the IBM 2216 and AIX platforms. In these systems, the same IP address that the Network Dispatcher node 18 advertises to the routing network 12 is activated on server nodes 16 as loopback addresses. The node performing the distribution function connects to the endpoint stack via a single hop connection because normal routing protocols typically cannot be used to get a connection request from the endpoint to the distributing node if the endpoint uses the same IP address as the distributing node advertises. Network Dispatcher uses an application on the server to query a workload management function (such as WLM of System/390), and collects this information at intervals, e.g. 30 seconds or so. Applications running on the Network Dispatcher node can also issue "null" queries to selected application server instances as a means of determining server instance health.

In addition to the above described systems, Cisco Systems offers a Multi-Node Load Balancing function on certain of its routers that perform the distribution function. Such operations appear similar to those of the IBM 2216.

Finally, in addition to the system described above, Ace-Director from Alteon provides a virtual IP address and performs network address translation to a real address of a selected server application. AceDirector appears to observe connection request turnaround times and rejection as a mechanism for determining server load capabilities.

SUMMARY OF THE INVENTION

Methods, systems and computer program products according to embodiments of the present invention provide for communicating with a plurality of application instances executing on a cluster of data processing systems utilizing a single Internet Protocol (IP) address. A distributing data processing system is notified if an application opens a listening socket utilizing any port associated with the single IP address. Potential target data processing systems in the cluster of data processing systems are identified at the distributing data processing system based on the notification. A request to establish a connection to the single IP address and a port associated with the single IP address at the distributing data processing system is received and a data processing system selected from the potential target data processing systems if the port associated with the request is associated with a potential data processing system. Communications for the connection are routed to the selected data processing system.

In further embodiments of the present invention, the distributing data processing system is notified if an application opens a listening socket utilizing an enumerated port if ports associated with the single IP address are enumerated. In such a case, the distributing data processing system is also notified if an application opens a listening socket utilizing any port associated with the single IP address if ports are not enumerated.

In still other embodiments of the present invention, the distributing data processing system is notified if an application opens a listening socket utilizing an enumerated port of the single IP address if ports associated with the single IP address are enumerated irrespective of whether the listening socket is opened with the single IP address specifically identified. The distributing data processing system is then notified if an application opens a listening socket utilizing any port associated with the single IP address if the listening socket is opened with the single IP address specifically identified.

In further embodiments of the present invention, a data processing system is selected by selecting a data processing system to distribute workload between the potential target data processing systems. Furthermore, it may be determined if a port associated with the received request is a unique port associated with a listening socket of an application on a data processing system within the cluster has a port associated. If so, the data processing system associated with the unique port is selected as a destination data processing system for the request and the request routed to the destination data processing system.

In further embodiments of the present invention, determining if a port associated with the received request is a unique port is provided by notifying the distributing data processing system if an application associated with a data processing system in the cluster of data processing systems opens a listening socket associated with the single IP address utilizing a unique port within the cluster of data processing systems so as to provide an identification of data processing systems associated with unique ports of the IP address. The port associated with the received request may be evaluated to determine if the port is a unique port associated with an identified data processing system. Furthermore, the unique port may be an ephemeral port.

In particular embodiments of the present invention, the distributing data processing system is a routing communication protocol stack.

Furthermore, determining if ports associated with the single IP address are enumerated may be provided by receiving at the data processing system in the cluster of data processing systems a definition that the single IP address is a distributed address from the distributing data processing system. The definition may include an indication of whether ports associated with the single IP address which are to be distributed are enumerated. The definition may be evaluated to determine if the ports associated with the single IP address are enumerated.

In further embodiments of the present invention, use of unique ports in a workload distribution system is provided by identifying to a distributing processor when an application of a data processing system opens a listening socket utilizing an IP address for which workload distribution is performed and a port that is uniquely assigned within a cluster of data processing systems. In response to the identification, a route is established at the distributing processor to the data processing system independent of workload distribution such that connection requests to the IP address and the unique port received at the distributing processor are routed to the data processing system.

In additional embodiments of the present invention, a request for a connection is received at the distributing processor. The established route is utilized if the request for a connection is to the listening socket. A target for the request for a connection may be determined if the request for a connection is not to the listening socket and a route established to the target. The request for a connection is also forwarded to the target. Determining a target may be provided by selecting a target from a plurality of candidate targets based on workload distribution.

In particular embodiments of the present invention, the distributing processor is a routing communication protocol stack. In such embodiments, the identification to a distributing processor may be provided by sending a connection administration message from a first communication protocol stack to the routing communication protocol stack, wherein the connection administration message identifies an IP address and port of the listening socket. Furthermore, the cluster of data processing systems is a SYSPLEX.

As will further be appreciated by those of skill in the art, the present invention may be embodied as methods, apparatus/systems and/or computer program products.

DETAILED DESCRIPTION OF THE INVENTION

Figure 1:
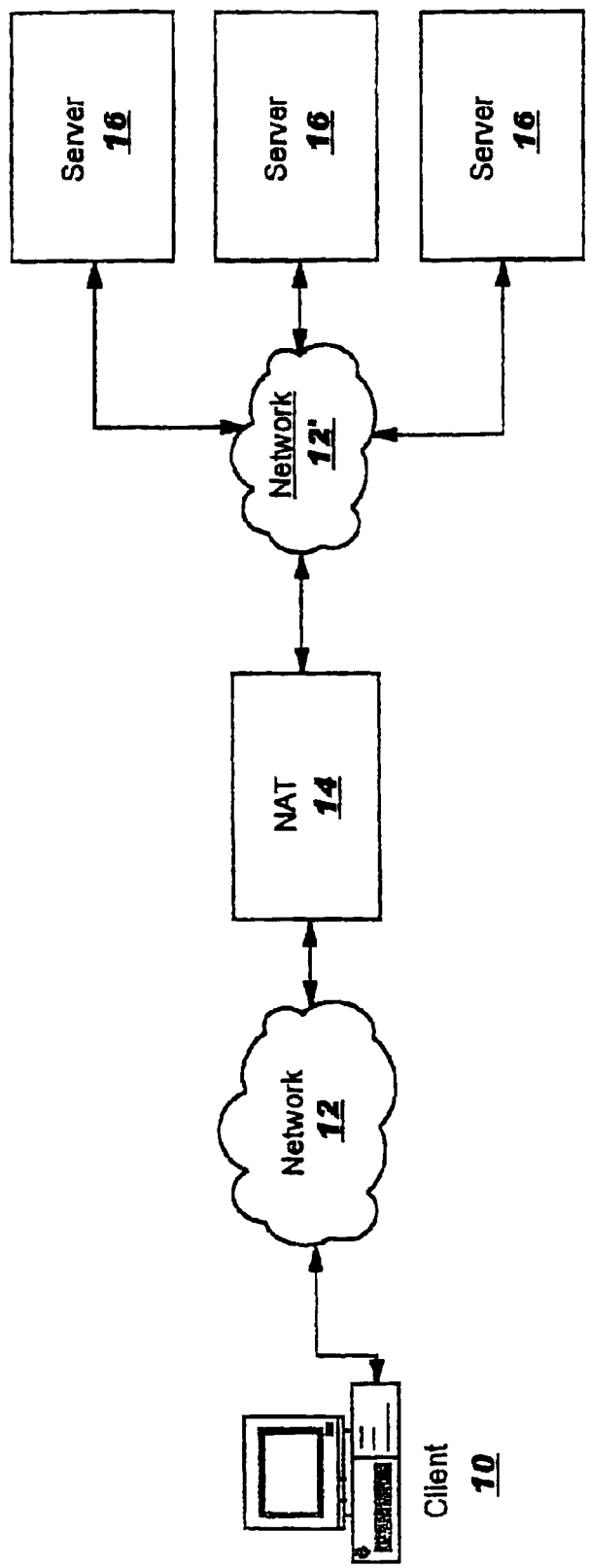
FIG. 1 is block diagram of a conventional network address translation system.
Figure 2:
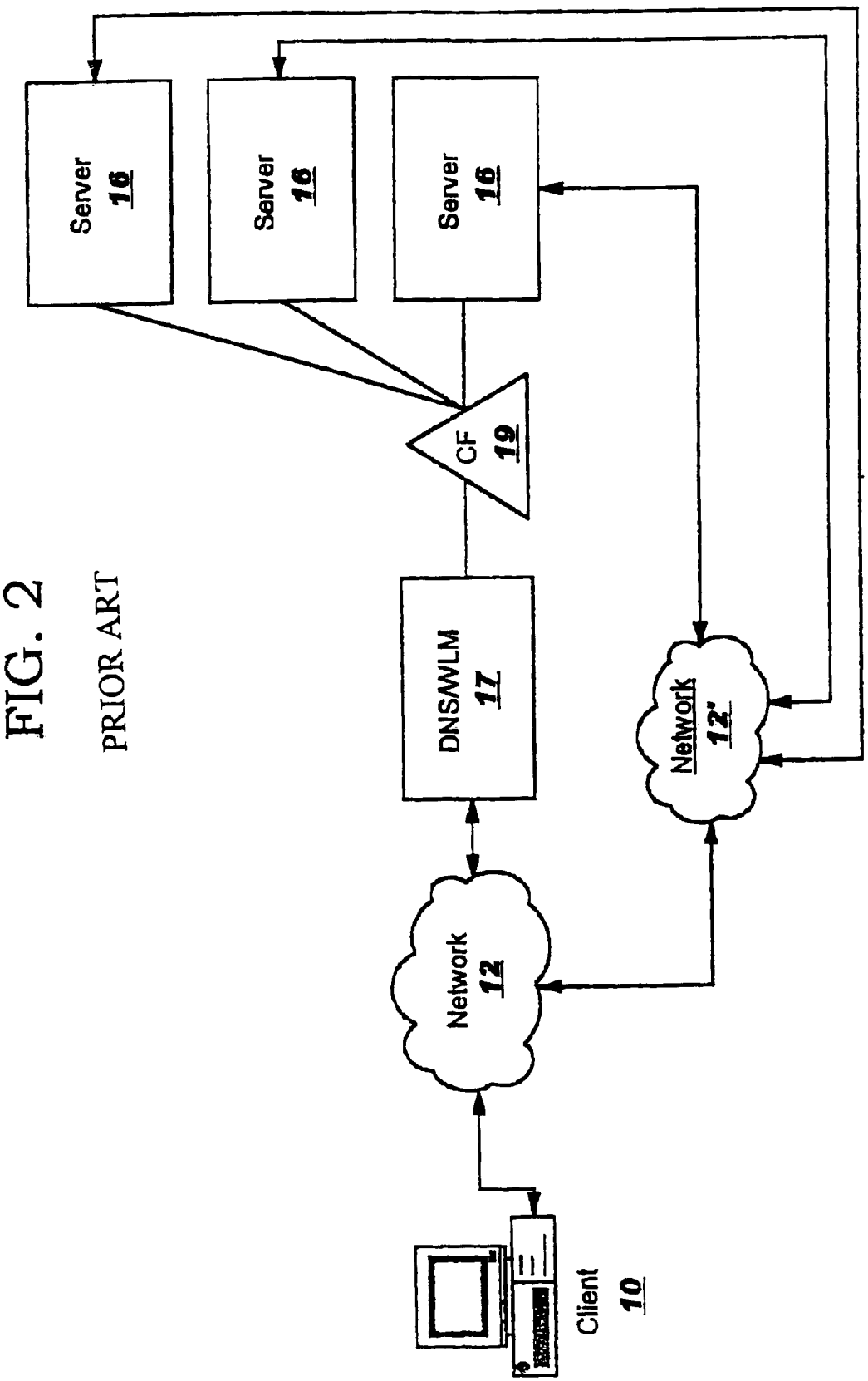
FIG. 2 is block diagram of a conventional DNS/WLM system.
Figure 3:
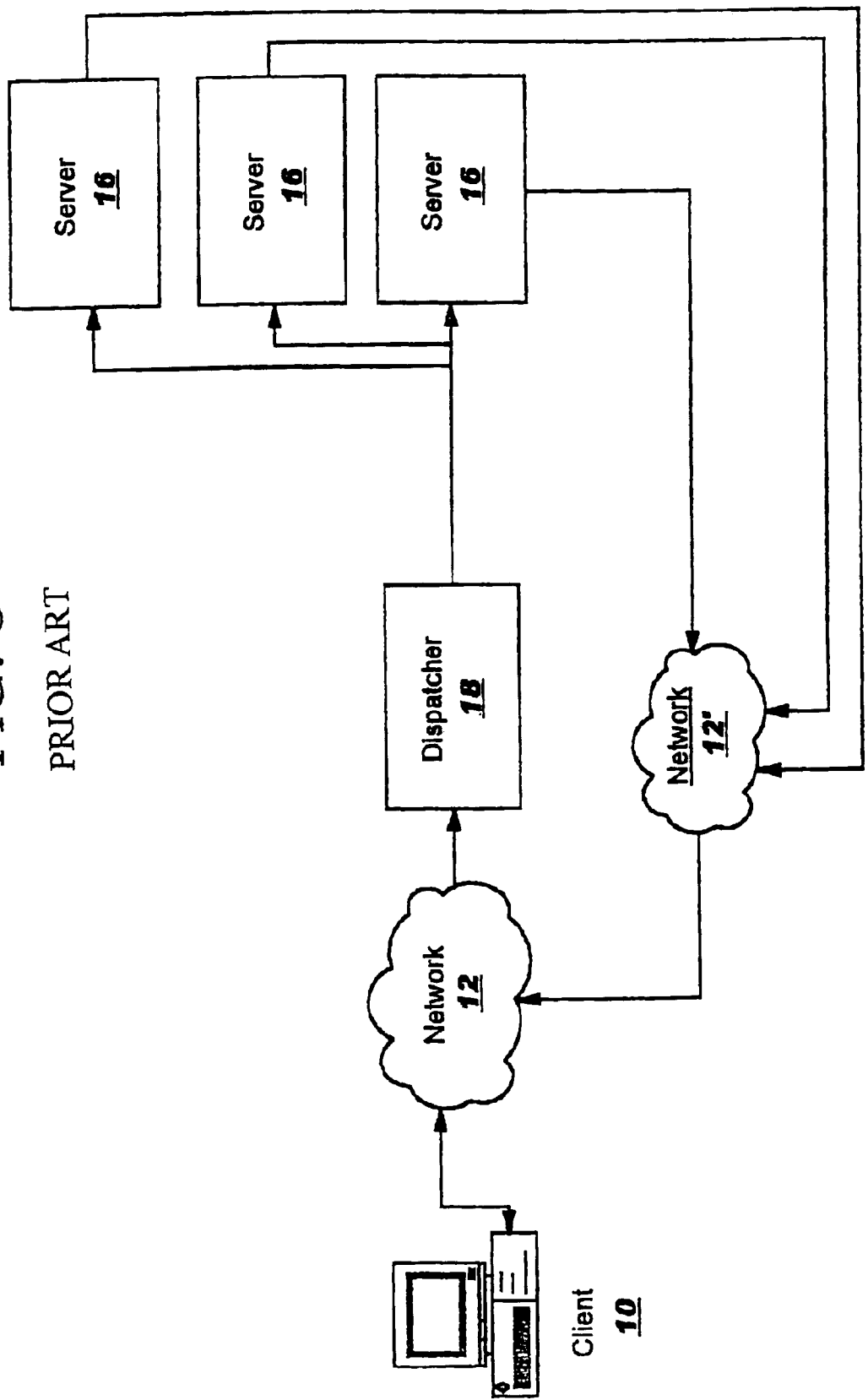
FIG. 3 is block diagram of a conventional dispatcher system.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

In some instances, servers may need to establish connections to other servers in order to process a request from the original client. These secondary connections may cross enterprises, and may, thus, traverse multiple firewalls. When such servers are used in conjunction with Sysplex Distributor, such as described, for example, in application Ser. No. 09/640,409, filed Aug. 17, 2000, and entitled "METHODS, SYSTEMS AND COMPUTER PROGRAM PRODUCTS FOR CLUSTER WORKLOAD DISTRIBUTION," or other IP workload balancing solutions, a server instance on one TCP/IP stack could use a different SOURCEVIPA than a server instance on another stack. All intervening firewalls may, therefore, need to be configured to be aware of, and permit passage of, connection requests from any possible VIPA that might be used as a SOURCEVIPA. One benefit of Sysplex Distributor may be that clients outside the Sysplex generally reach all such server instances using the same IP address. Thus, customers would, typically, prefer the server instances going to secondary servers to use the same Distributed DVIPA to reduce configuration of intervening firewalls to a single IP address, independent of where the server instances reside (or might be moved) within the Sysplex.

Furthermore, multiple server instances in a Sysplex Distributor environment may need to establish connections to exactly the same secondary server. A TCP connection is generally identified by source and destination IP address, and source and destination port numbers (the combination of which is known as the "connection 4-tuple"). In this case, the destination IP address and port are the same for all such connections. Programs initiating outbound connections seldom specify source IP address, and almost never specify the port. Instead, they rely on the TCP/IP stack to select a port which is at present not in use by another TCP application. Such a port assignment is known as an "ephemeral port." When a source IP address could reside on only one TCP/IP stack, it did not matter that two different stacks might assign the same ephemeral port number, because the source IP addresses for connections to the same secondary server would be different. Now that Sysplex Distributor allows the same IP address to reside on multiple TCP/IP stacks, and for that same IP address to be used for connections to the rest of the network, it is possible that two stacks could generate the same connection 4-tuple for connections from different Sysplex Distributor server instances to the same secondary server.

Embodiments of the present invention may provide for cluster-wide port assignments such that a unique port may be provided for a socket. Furthermore, such cluster-wide port assignments may be provided in the context of a workload distribution system. Additionally, increased flexibility in establishing ports associated with workload distribution may be provided by allowing enumerated ports and/or all ports of a common IP address to be associated with workload distribution. Thus, the present invention can be embodied as systems, methods, or computer program products for workload distribution in a cluster of data processing systems where a single IP address may be associated with a plurality of data processing systems and/or protocol stacks in the cluster of data processing systems and a port of the single IP address may be shared among multiple data processing systems and/or protocol stacks or may be unique among the plurality of data processing systems and/or protocol stacks.

Figure 4:
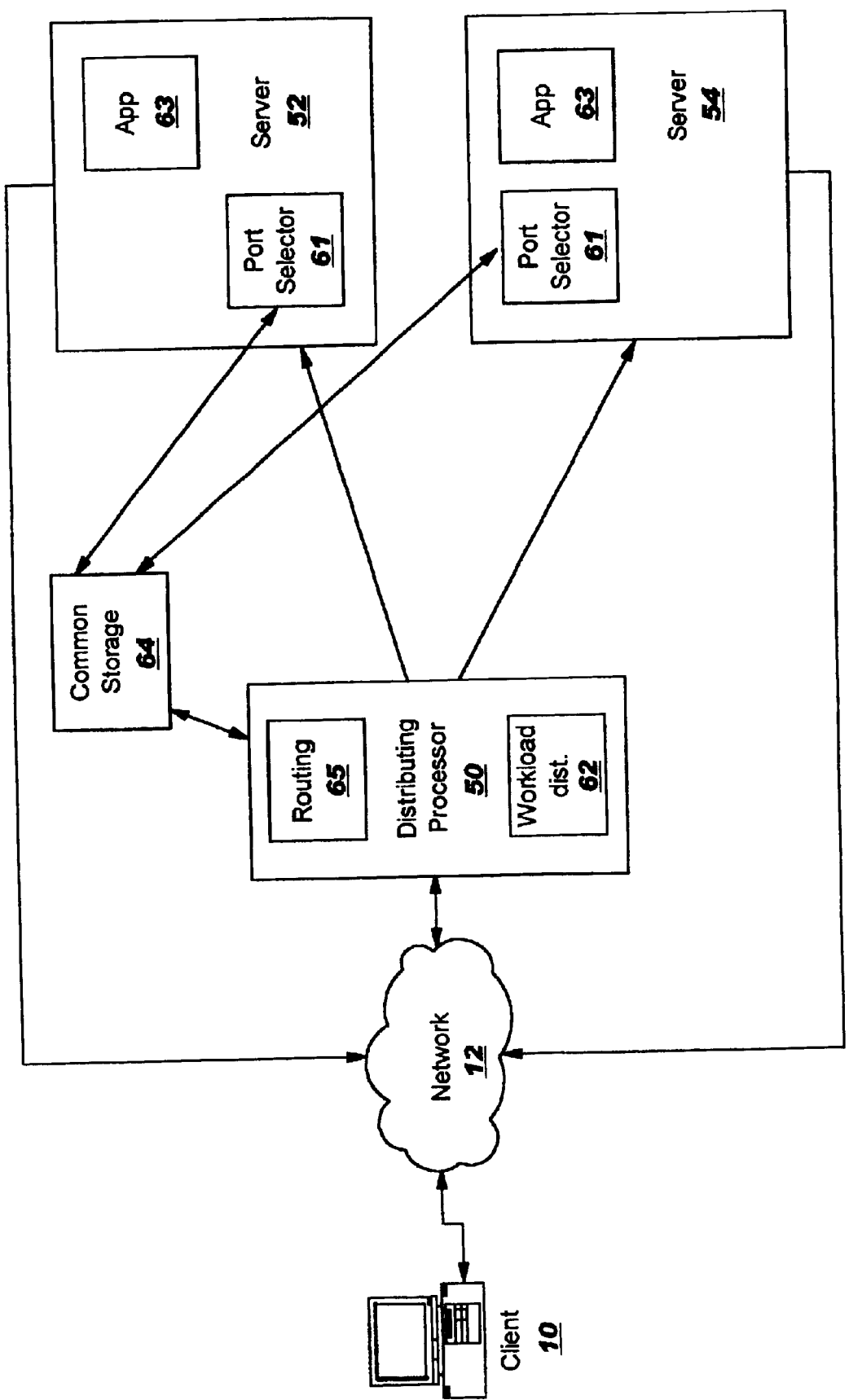
FIG. 4 is block diagram of a cluster of data processing systems incorporating embodiments of the present invention.

FIG. 4 illustrates an environment in which embodiments of the present invention may be utilized. As seen in FIG. 4, the client 10 communicates over the network 12 to communicate with a distributing processor 50. The distributing processor 50 may perform workload management and may distribute network communications for connections to a common IP address shared by the servers 52 and 54 such that the client 10 may communicate with any of the servers 52 or 54 utilizing the common IP address as a destination address. Thus, the distributing processor 50 may include a workload distribution module and/or circuit 62 and a routing module and/or circuit 65. The distributing processor 50 may also function as a server and, thus, be the ultimate endpoint of communications with the client 10.

The servers 52 and 54, and the distributing processor 50 may be data processing systems in a cluster of data processing systems. Also, there may be multiple servers in a single data processing system. The distributing processor 50 and the servers 52 and 54 may also provide for the movement of IP addresses such that an IP address may be moved from data processing system to data processing system. Accordingly, other data processing systems in the cluster may become the distributing processor for the IP address, for example, in the event of failure. The common IP address may, in certain embodiments, also be a dynamic IP address. Additionally, the common IP address and/or the dynamic IP address may also be virtual IP addresses.

In operation, when the distributing processor 50 receives communications from the client 10 to the common IP address, the distributing processor 50 utilizes the workload distribution module and/or circuit 62 and/or the routing module and/or circuit 65 to route these communications to appropriate ones of the servers 52 or 54. Outbound communications from the servers 52 or 54 need not be routed through the distributing processor 50. Furthermore, outbound connections to clients utilizing the common IP address may also be initiated without going through the distributing processor 50. For example, a connection utilizing the common IP address, such as a connection to the server 52, may have inbound communications routed through the distributing processor 50 and to the server 52 while outbound communications are routed from the server 52 to the network 12 without passing through the distributing processor 50. Similarly, if the server 52 initiates a connection, this connection may be initiated directly onto the network 12.

FIG. 4 also illustrates a common storage 64 which may be utilized by a port selector module and/or circuit 61 which may select a port for use by outbound connections utilizing the common IP address as a source address for the connection and/or for port selection for listening ports established by the data processing systems in the cluster or data processing systems based on port status information contained in the common storage 64. The port status information may be maintained by the port selector module(s) and/or circuit (s) 61 so as to provide up-to-date information on the availability of a port for a given common IP address. Such port selector modules 61 may operate as described herein, possibly in cooperation with other port selector modules 61 on processing systems in the cluster, and, thereby, coordinate selection of ports for the common IP address so as to provide a port (referred to herein as a "unique port") which results in a unique identification, such as a unique 4-tuple (source address, source port, destination address, destination port) and/or a unique tuple of IP address and port, for connections and/or listening sockets utilizing the common IP address.

As will be appreciated by those of skill in the art, while the common storage 64 may be utilized to share information which may allow cluster-wide coordinated assignment of ports, other information sharing techniques may also be utilized. For example, information could be broadcast or otherwise transmitted to processors and the information maintained at each processor using cluster-wide port assignment. Similarly, the processors could broadcast or otherwise transmit the information to the distributing processor which could maintain port information for each common IP address for which it had distribution responsibilities. Accordingly, other mechanisms for sharing information to provide cluster-wide port assignments may be utilized while still benefitting from the teachings of the present invention.

Furthermore, workload distribution according to embodiments of the present invention may be provided for all or enumerated ones of the ports associated with a common IP address. As used herein "enumerated ports" refers to an identification of less than all of the ports associated with a common IP address, either individually, in a range or ranges of ports and/or individually and in a range or ranges of ports. Cluster-wide port assignment may be combined with workload distribution in certain embodiments of the present invention. In such cases, the ports which are provided by cluster-wide port assignment may be non-overlapping or overlapping with the ports for which workload distribution is provided. For example, if the ports for which workload distribution and cluster-wide port assignment are overlapping, unique ports may be individually identified as they are utilized and workload distribution may be bypassed for such ports while ports which are not required to be unique may be subject to workload distribution.

While the present invention is described above with reference to servers, such servers may also be referred to as hosts, target hosts or target data processing systems and represent an endpoint for communications from the network. Similarly, the distributing processor may be a data processing system or other network device, or portion thereof, capable of carrying out the operations described herein.

Figure 5:
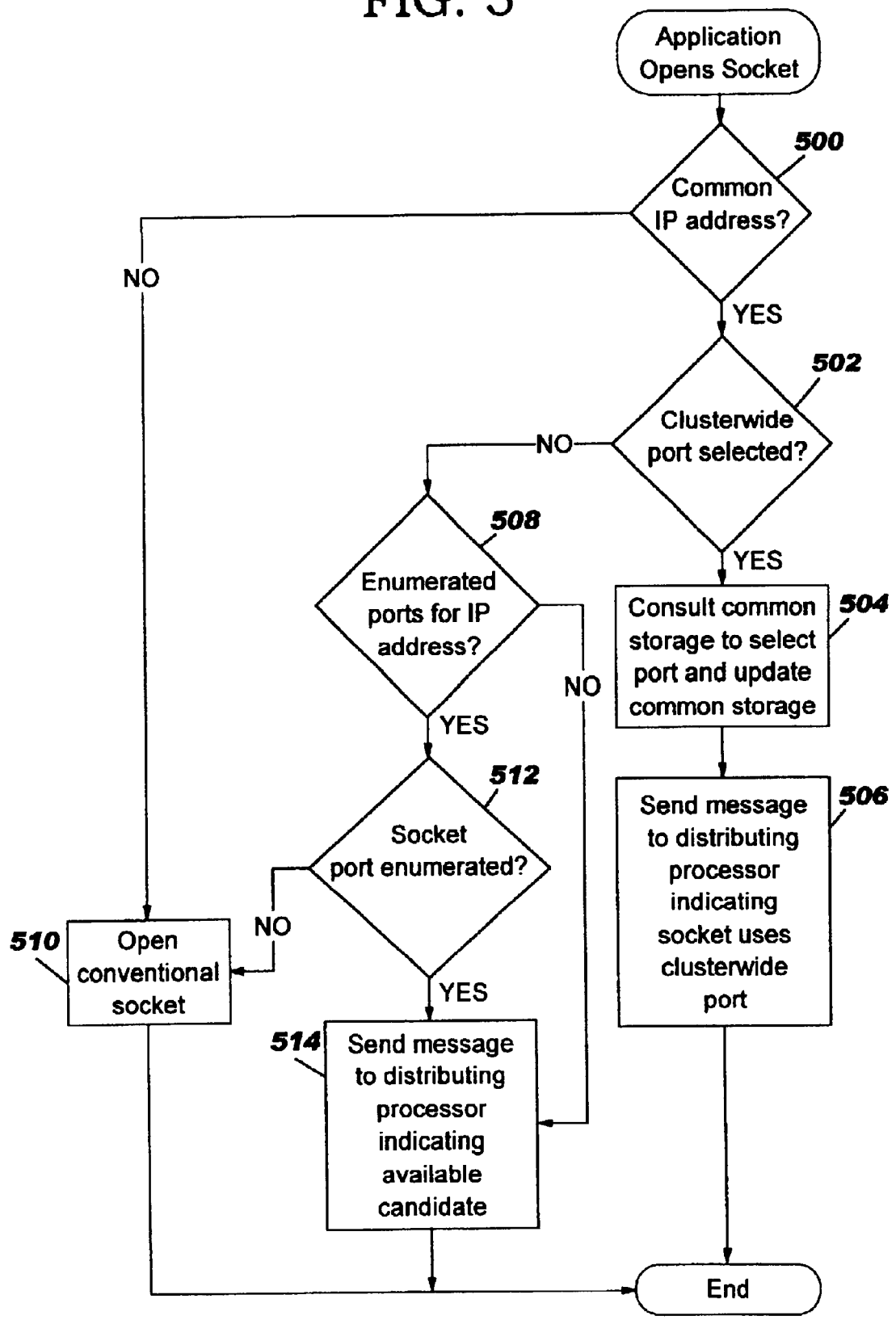
FIG. 5 is a flowchart illustrating operations for port selection for shared addresses according to embodiments of the present invention.

FIG. 5 illustrates operations of a server 52 or 54 when an application on the server 52 or 54 opens a listening socket according to embodiments of the present invention and may, for example, be carried out by the port selection module or circuit 61. As seen in FIG. 5, the address of the listening socket is evaluated to determine if a common IP address is specified as the address (block 500). If the address is not a common IP address (block 500), conventional operations for opening a listening socket may be utilized (block 510). If, however, the address is a common IP address (block 500), it may be determined if cluster-wide port assignment is provided for the port of the listening socket (block 502). If cluster-wide port assignment is not provided, it is determined if enumerated ports for which workload distribution is to be performed are identified for the common IP address (block 508). If ports are not enumerated (block 508), it is assumed that workload distribution is provided for all ports associated with the common IP address and a message is sent to the distributing processor 50 identifying the server 52 or 54 opening the listening socket as an available candidate for workload distribution (block 514).

If ports are enumerated (block 508), the port of the socket being opened is evaluated to determine if it corresponds to an enumerated port for workload distribution (block 512). If the port corresponds to an enumerated port associated with the common IP address (block 512), a message is sent to the distributing processor 50 identifying the server 52 or 54 opening the listening socket as an available candidate for workload distribution (block 514). If the port does not correspond to an enumerated portion associated with the common IP address (block 512), the socket may be opened in a conventional manner (block 510).

Alternatively, in embodiments of the present invention where an application may open a listening socket utilizing a specified IP address or an unspecified IP address (such as an application binding to IN_ADDR_ANY in OS/390), workload distribution may be provided for all ports irrespective of whether particular ports are enumerated if the bind operations associated with the listening socket is performed utilizing a specified IP address and the enumerated ports if the bind operation associated with the listening socket is performed utilizing an unspecified IP address. Thus, if the listening socket is opened utilizing the common IP address as a specified IP address, the operations of blocks 508 and 512 may be bypassed and the output of block 502 is provided directly to block 514. Otherwise, if the listening socket is opened utilizing an unspecified IP address, the operations would continue from block 508.

Returning to block 502, if cluster-wide port assignment is provided for the common IP address (block 502), the common storage 64 is accessed to select an unused port for the connection (block 504). The selected port is identified in the common storage 64 as used or unavailable (block 504) so that other data processing systems will not select the same port. A message is also sent to the distributing processor 50 to identify the address and port of the listening socket (block 506).

Figure 6:
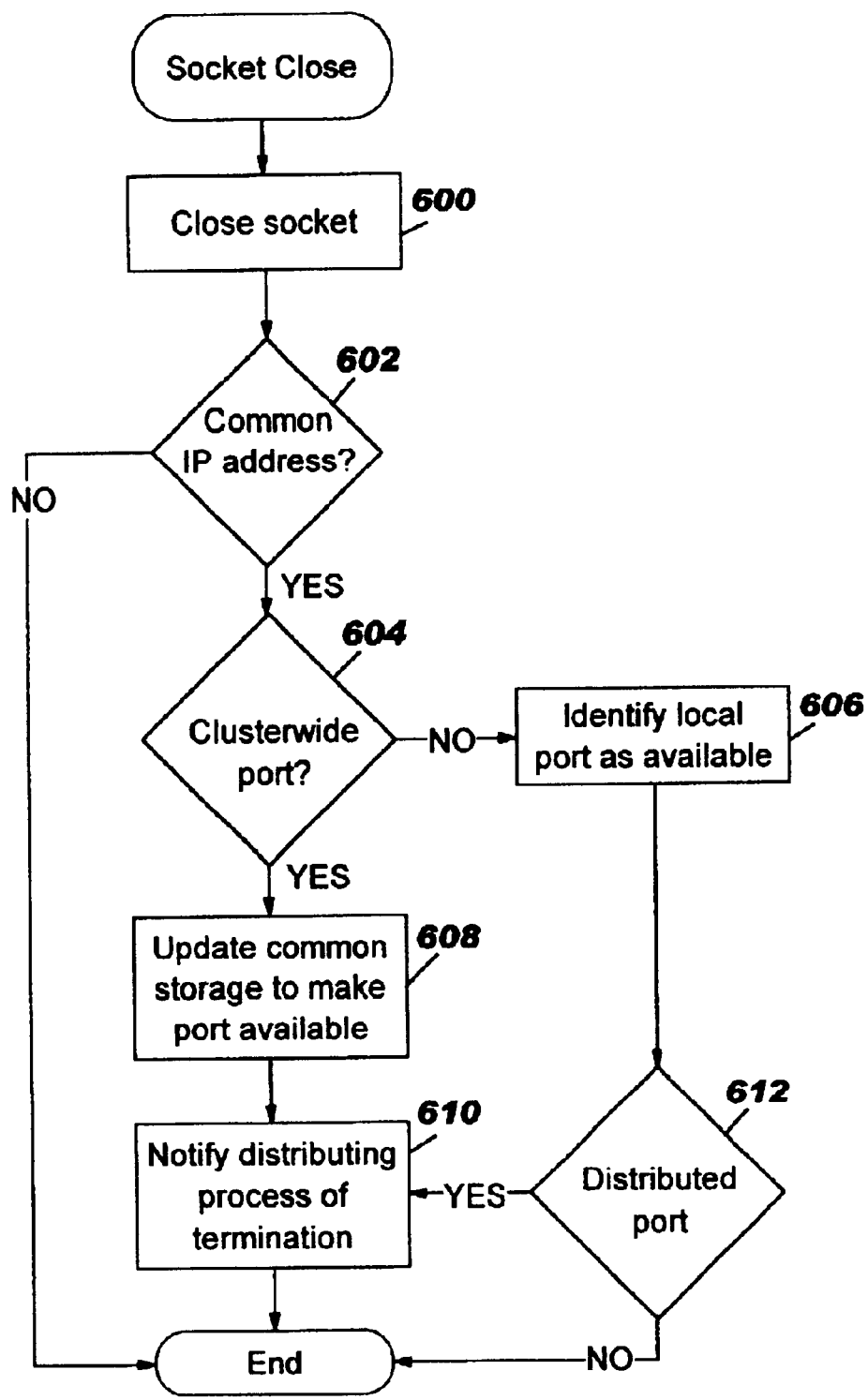
FIG. 6 is a flowchart illustrating operations for termination of a connection utilizing port selection according to embodiments of the present invention.

FIG. 6 illustrates operations of, for example, the port selector module and/or circuit 61, when a socket is closed. As seen in FIG. 6, the socket is closed (block 600). The address of the socket is evaluated to determine if a common IP address is associated with the socket (block 602). If the address is not a common IP address (block 602), operations may terminate. If, however, the address is a common IP address (block 602), it is determined if the port of the socket is a cluster-wide port (block 604). If so, the common storage 64 is accessed and updated to indicate that the port is unused and, therefore, available for use (block 608). The distributing processor is also notified that the socket has been closed (block 610).

If the port is not a cluster-wide port (block 604), the port is identified locally as available (block 606) and it is determined if the port is identified as participating in workload distribution, either as an enumerated port or because all ports of the IP address are participating (block 612). If the port is not identified as participating in workload distribution (block 612), operations conclude. However, if the port is identified as participating in workload distribution (block 612), the distributing processor is also notified that the socket has been closed (block 610).

Figure 7:
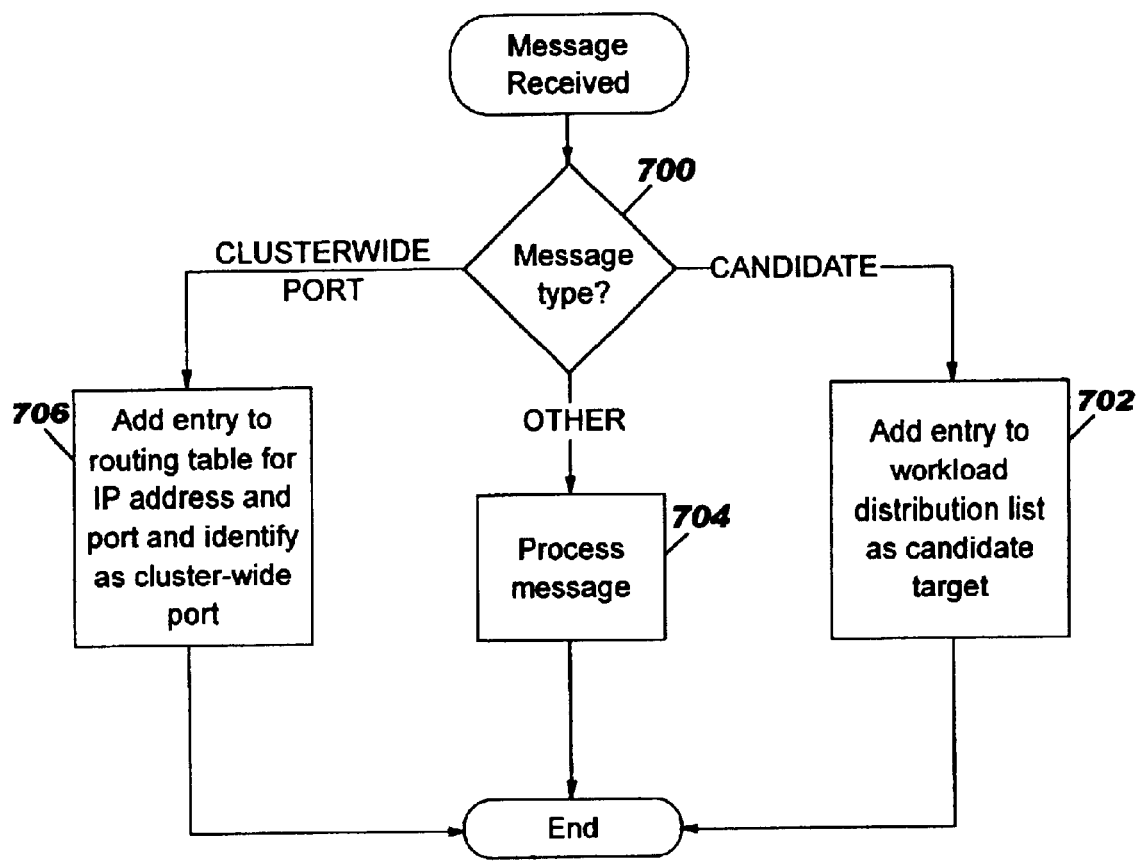
FIG. 7 is a flowchart illustrating operations for workload distribution with cluster-wide port selection according to embodiments of the present invention.

FIG. 7 illustrates operations of the workload distribution module and/or circuit 62 and/or the routing module and/or circuit 65 when a message is received by the distributing processor 50. As seen in FIG. 7, when a message is received, the message is evaluated to determine the message type (block 700). If the message identifies a candidate server (block 700), such as server 52 or 54, a list of candidate servers for workload distribution is updated to reflect the availability of the IP address and port for distribution of subsequent connections (block 702).

If the message identifies a socket utilizing a cluster-wide port (block 700), because the port is a unique port, an entry may be made directly in a routing table and the entry identified as associated with a cluster-wide port such that connections to that port and IP address may be directly routed to the associated server without consulting workload distribution (block 706).

If the message is of another type (block 700), then processing of the message may be carried out based on the type of other message (block 704). For example, other messages and their processing are described in U.S. patent application Ser. No. 09/640,409, filed Aug. 17, 2000, and entitled "METHODS, SYSTEMS AND COMPUTER PROGRAM PRODUCTS FOR CLUSTER WORKLOAD DISTRIBUTION" and/or U.S. patent application Ser. No. 09/862,968, filed May 22, 2001, and entitled "METHODS, SYSTEMS AND COMPUTER PROGRAM PRODUCTS FOR PORT ASSIGNMENTS OF MULTIPLE APPLICATION INSTANCES USING THE SAME SOURCE IP ADDRESS", and published as United States Patent Application Publication No. 2002/0178268, the disclosures of which are incorporated herein by reference as if set forth filly herein.

Figure 8:
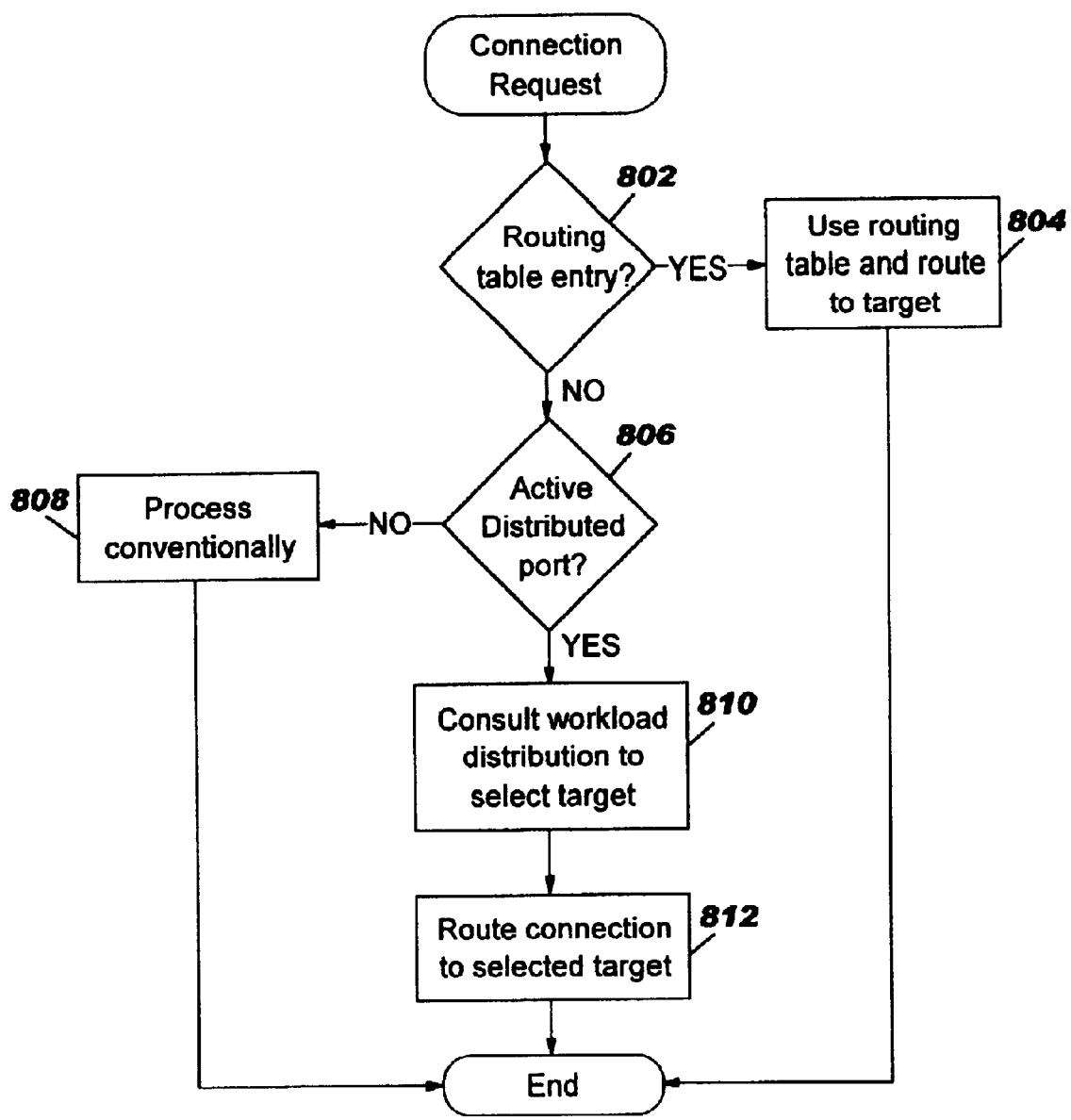
FIG. 8 is a flowchart illustrating operations for workload distribution with cluster-wide port selection according to embodiments of the present invention.

FIG. 8 illustrates operations of the distributing processor 50 when a connection request is received from the network 12. The connection request is evaluated to determine if a routing table entry already exists for the destination IP address and port (e.g., the port is a cluster-wide unique port) (block 802). In certain embodiments, a determination may include determining if an entry having the 4-tuple of source IP address, source port, destination IP address and destination port is present in the routing table. Furthermore, multiple searches may be utilized in certain embodiments of the present invention, where a first search looks for an exact match of the 4-tuple and a subsequent search looks for a partial match of the 4-tuple from the request (e.g. a search with source IP address and port set to zero). If so, the routing table is utilized to route the connection request to the target (block 804).

If a routing table entry does not exist for the connection request(block 802), it is determined if the connection request is to an active distributed port (e.g. an enumerated port or any port if no ports are enumerated) (block 806). If not, the connection request is processed in a conventional manner (block 808). If the connection request is to an active distributed port (block 806), the workload distribution function is accessed to select a target for the request (block 810). The connection request is forwarded to the selected target (block 812).

In particular embodiments of the present invention, distribution of connections associated with the common IP address may be provided by providing a routing protocol stack which associates a Virtual IP Address (VIPA) and port with other communication protocol stacks in the cluster and routes communications to the VIPA and port to the appropriate communication protocol stack. VIPAs capable of being shared by a number of communication protocol stacks are referred to herein as "dynamic routable VIPAs" (DVIPA). While the present invention is described below with reference to a specific embodiment in a System/390 Sysplex, as will be appreciated by those of skill in the art, the present invention may be utilized in other systems where clusters of computers utilize virtual addresses by associating an application or application group rather than a particular communications adapter with the addresses. Thus, the present invention should not be construed as limited to the particular exemplary embodiments described herein.

Figure 9:
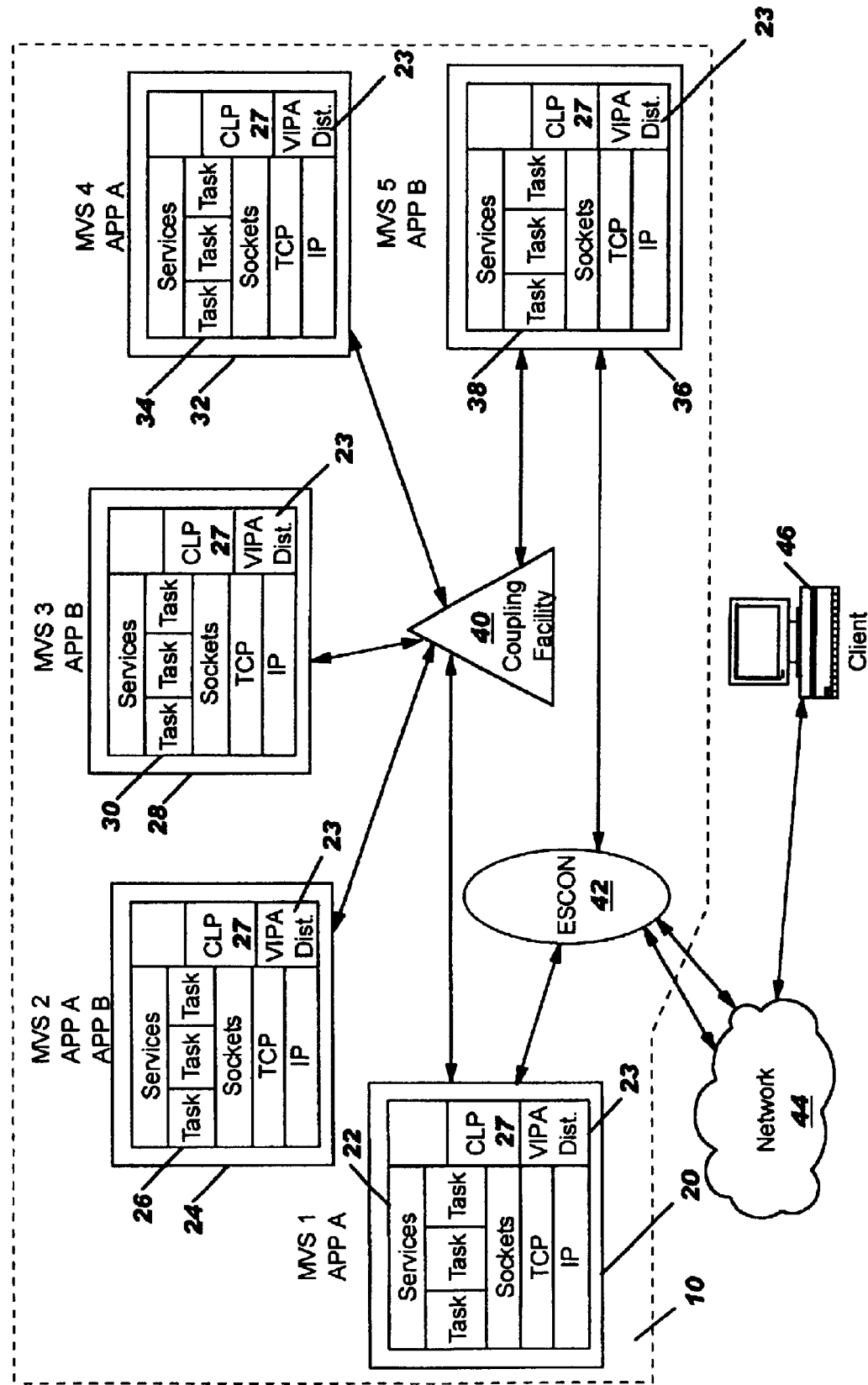
FIG. 9 is block diagram of a cluster of data processing systems incorporating embodiments of the present invention.

A cluster of data processing systems is illustrated in FIG. 9 as a cluster of nodes in Sysplex 10. As seen in FIG. 9, several data processing systems 20, 24, 28, 32 and 36 are interconnected in a Sysplex 10. The data processing systems 20, 24, 28, 32 and 36 illustrated in FIG. 9 may be operating system images, such as MVS images, executing on one or more computer systems. While the present invention will be described primarily with respect to the MVS operating system executing in a System/390 environment, the data processing systems 20, 24, 28, 32 and 36 may be mainframe computers, mid-range computers, servers or other systems capable of supporting dynamic routable Virtual IP Addresses and which are capable of error recovery as described herein.

As is further illustrated in FIG. 9, the data processing systems 20, 24, 28, 32 and 36 have associated with them communication protocol stacks 22, 26, 30, 34 and 38, which may be TCP/IP stacks. The communication protocol stacks 22, 26, 30, 34 and 38 have been modified to incorporate a VIPA distribution function 23 as described herein for providing dynamic routable VIPAs so as to provide a single IP address for multiple communication protocol stacks.

While each of the communication protocol stacks 22, 26, 30, 34 and 38 illustrated in FIG. 4 incorporate the VIPA distribution function 23, not all communication protocol stacks in a Sysplex need incorporate the VIPA distribution function 23. Thus, the present invention may be carried out on any system where two or more communication protocol stacks in a cluster of data processing systems support dynamic routable VIPAs. If a communication protocol stack does not support dynamic routable VIPA, then the dynamic routable VIPA messages according to the present invention may be ignored by the communication protocol stack. Thus, some embodiments of the present invention can provide backward compatibility with existing communication protocol stacks.

As is further seen in FIG. 9, the communication protocol stacks 22, 26, 30, 34 and 38 may communicate with each other through a coupling facility 40 of the Sysplex 10, for example, utilizing XCF messaging. Furthermore, the communication protocol stacks 22 and 38 may communicate with an external network 44 such as the Internet, an intranet, a Local Area Network (LAN) or Wide Area Network (WAN) utilizing the Enterprise System Connectivity (ESCON) 42. Thus, a client 46 may utilize network 44 to communicate with an application executing on an MVS image in Sysplex 10 through the communication protocol stacks 22 and 38 which may function as routing protocol stacks as described herein.

As is further illustrated in FIG. 9, as an example of utilization of the present invention and for illustration purposes, data processing system 20 has associated with it communication protocol stack 22 which is associated with MVS image MVS 1 which has application APP A executing on MVS image MVS 1 and utilizing communication protocol stack 22 to allow access to, for example, client 46 through network 44. Similarly, data processing system 24 has associated with it communication protocol stack 26 which is associated with MVS image MVS 2 which has a second instance of application APP A and an instance of application APP B executing on MVS image MVS 2 which may utilize communication protocol stack 26 for communications. Data processing system 28 has associated with it communication protocol stack 30 which is associated with MVS image MVS 3 which has a second instance of application APP B executing on MVS image MVS 3 which may utilize communication protocol stack 30 for communications. Data processing system 32 has associated with it communication protocol stack 34 which is associated with MVS image MVS 4 which has a third instance of application APP A executing on MVS image MVS 4 which may utilize communication protocol stack 34 for communications. Finally, data processing system 36 has associated with it communication protocol stack 38 which is associated with MVS image MVS 5 which has a third instance of application APP B executing on MVS image MVS 5 which may utilize communication protocol stack 38 for communications. Furthermore, each of the communication protocol stacks 22, 26, 30, 34 and 38 are illustrated as including a cluster-wide port assignment module or circuit (CLP) 27.

Utilizing the above described system configuration as an example, a VIPA distribution function 23 according to embodiments of the present invention will now be described. The VIPA distribution function 23 allows for protocol stacks which are defined as supporting DVIPAs to share the DVIPA and communicate with network 44 through a routing protocol stack such that all protocol stacks having a server application which is associated with the DVIPA will appear to the network 44 as a single IP address. Such dynamically routable VIPAs may be provided by designating a protocol stack, such as protocol stack 22, as a routing protocol stack, notifying other protocol stacks of the routing protocol stack and having other protocol stacks notify the routing protocol stack when an application which binds to the DVIPA issues a listen( ). Because communications to the DVIPA are routed through the routing protocol stack, the routing protocol stack may provide work load balancing by distributing connections to the other protocol stacks on MVS images executing server applications which bind to the DVIPA to balance workload. Furthermore, in particular embodiments of the present invention, scalability and availability may be provided by allowing all protocol stacks for MVS images which execute applications which bind to the DVIPA to have communications routed through the routing protocol stack without user intervention to establish the routing path.

The communication protocol stacks 22, 26, 30, 34 and 38 may be configured as to which stacks are routing stacks, backup routing stacks and server stacks. Different DVIPAs may have different sets of backup stacks, possibly overlapping. In some embodiments, the definition of backup stacks may be the same as that for the VIPA takeover function described in U.S. Pat. No. 6,430,622, entitled "METHODS, SYSTEMS AND COMPUTER PROGRAM PRODUCTS FOR AUTOMATED MOVEMENT OF IP ADDRESSES WITHIN A CLUSTER" which is incorporated herein by reference as if set forth fully herein.

Utilizing the system illustrated in FIG. 9 for the present example, the application APP A is associated with a DVIPA VA1 which may be associated with the respective first, second and third instances of APP A; and application APP B likewise has a DVIPA VB1 associated with the respective first, second and third instances of APP B.

Configuration of a dynamic routable VIPA may be provided by a definition block established by a system administrator for each routing communication protocol stack 22 and 38. The new definition block defines dynamic routable VIPAs for which a communication protocol stack operates as the primary communication protocol stack. Backup protocol stacks may be defined as described of the VIPA takeover procedure. Thus, a definition block "VIPADynamic" may be defined as VIPADynamic Dynamic Routable VIPA definitions . . .

ENDVIPADynamic

The definitions within the VIPADynamic block for a protocol stack supporting moveable VIPAs are:

VIPADEFine MOVEable IMMEDiate netMaski paddr . . . where the netMask is used to determine the network prefix to be advertised to routing daemons for OSPF or RIP and ipaddr is the IP address of the DVIPA. Both network prefix (sometimes known as subnet address) and the mask will be advertised to the routing daemon. All of the VIPAs in a single VIPADEFine statement must belong to the same subnet, network, or supernet, as determined by the network class and address mask. The MOVEable IMMEDiate parameters define the VIPAs as moveable VIPAs which may be transferred from one communication protocol stack to another. As will be appreciated by those of skill in the art in light of the present disclosure, while the MOVEable IMMEDiate parameters are expressly defined in the above definition statements, these or other parameters may be the default parameters which are provided unless specified otherwise. Thus, the parameters need not be expressly called out in all instances.

The definitions within the VIPADynamic block for backup are:

VIPABackup rank ipaddr . . .
where the rank is a number between 1 and 254 used to determine relative order within the backup chain(s) for the associated dynamic routable VIPA(s). A communication protocol stack with the higher rank will take over the dynamic VIPAs before a communication protocol stack with a lower rank.

The definitions in the VIPADYNamic block for defining a VIPA as a dynamic routable VIPA are:

VIPADISTribute ipaddr PORT portlist DESTIP ipaddrlist
where ipaddr is a VIPA defined in the VIPADEFine, portlist is a list of ports for which the DVIPA will apply. If the PORT keyword is omitted, then all ports for the ipaddr will be considered as DVIPAs. Enumerating ports for distribution may guarantee distribution for at least those ports, even when an application does not bind the listening socket specifically to the Distributed DVIPA, but instead binds the listening socket to INADDR_ANY. Alternatively, all stacks with applications bound to any port of a DVIPA may be considered as potential target stacks even if ports are enumerated. In such a case, the fact that a listening socket is bound to the Distributed DVIPA on a target stack, but to a port that is not one of the enumerated ports, will not prevent that Distributed DVIPA/port pair from being entered into the DPT as a candidate ready to receive work targeted at that pair.

The ipaddrlist is a list of protocol stacks which will be included as server stacks in routing communications directed to the DVIPA. The IP addresses in the ipaddrlist may be XCF addresses of the protocol stacks or may be designated "ALL." If "ALL" is designated, then all stacks in the Sysplex are candidates for distribution. This may include future stacks which are not active when the routing stack is initialized. Thus, if ALL is specified, a protocol stack may be added to the DVIPA without disruption of operations and without user intervention to redefine the stack in the VIPA-Dynamic block.

In addition to the above definitions, a range of IP addresses may be defined as DVIPAs utilizing the VIPARange definition. A VIPARange definition of the form:

VIPARange MOVEable NONDISRUPTIVE netMASK ipAddr
may designate all future VIPAs created in the range as moveable or dynamic routable VIPAs. The MOVEable NONDISRUPTIVE parameters allows future instance-specific dynamic VIPAs to participate as dynamic routable VIPAs but does not affect dynamic VIPAs created under the range before the keyword DISTribute was added (e.g. via VARY OBEY).

The communication protocol stacks 22 and 38, which are designated as routing protocol stacks as they have connections to the network 44 and include VIPADISTribute statements in the VIPADynamic block, publish the distribution information through messages broadcast by the VIPA takeover function 23 of each of the communication protocol stacks 22, 26, 30, 34 and 38 to the other communication protocol stacks 22, 26, 30, 34 and 38. At initialization or profile changes, the communication protocol stacks 22, 26, 30, 34 and 38 communicate to all partner communication protocol stacks the complete list of dynamic routable VIPAs, their associated ipAddrList and portlist and the primary and backup definitions for the communication protocol stack.

When a communication protocol stack 22, 26, 30, 34 and 38 receives the DVIPA information it notes if it is identified as a candidate target protocol stack or as a backup stack. If the protocol stack is a candidate target stack, it monitors its applications and sends a message to the defined routing stack when an application instance is bound to the DVIPA and listens on a defined port. If the protocol stack is a backup stack it stores the DVIPA information for use in the event of failure of the primary routing stack.

When a DVIPA is activated via VIPADEFINE with CLUSTERPORTS, a corresponding structure is created in the coupling facility 40 if it does not already exist, and an entry is created for the DVIPA if such an entry does not already exist. If CLUSTERPORTS is added via VARY OBEY, when the DVIPA is already active, the stack will scan the connection table, and indicate as in use all port numbers that are already used as local ports in a connection using the DVIPA. If this DVIPA is also a Distributed DVIPA, then the routing stack will also examine the Connection Routing Hash Table (CRHT) and update the coupling facility entry on behalf of all target stacks.

When a VIPARANGE configuration statement with the CLUSTERPORTS keyword is processed, the communication protocol stack searches its list of IP addresses to find active ones within the designated range. For each such IP address, the connection table is searched for connections to the DVIPA, and the coupling facility structure and corresponding entry are created as described above with reference to the VIPADEFINE.

Returning to the example of FIG. 9, for MVS1 to MVS5, the VIPADEFine statements may be:

MVS1:VIPADEFine MOVEable IMMEDiate DVA1
VIPADISTribute DVA1 PORT DESTIP XCF1, XCF2, XCF4
SOURCEIPA DVA1 APPA
MVS5:VIPADEFine MOVEable IMMEDiate CLUSTERPORTS DVB1
VIPADISTribute DVB1 PORT 60 DESTIP ALL
VIPADISTribute DVA1 PORT DESTIP XCF2, XCF3, XCF4
SOURCEIPA DVA1 APPA
SOURCEIPA DVB1 APPB For purposes of illustration, the respective address masks have been omitted because they are, typically, only significant to the routing daemons.

In the above illustration, XCF1 is an XCF address of the TCP/IP stack on MVS1, XCF2 is an XCF address of the TCP/IP stack on MVS2 and XCF3 is an XCF address of the TCP/IP stack on MVS4. Note that, for purposes of the present example, definitions for MVS2, MVS3, and MVS4 are not specified. Such may be the case because the protocol stacks for these MVS images are candidate target protocol stacks and are not identified as routing protocol stacks and, therefore, receive their dynamic routable VIPA definitions from the routing protocol stacks. Additional VIPA definitions may also be provided, however, in the interests of clarity, such definitions have been omitted.

While embodiments of the present invention have been described with reference to CLUSTERPORTS being specified as part of a VIPADEFINE or VIPARANGE statement, such common ports may also be specified in other definitions. For example, alternatively or in addition, cluster-wide ports may be specified in a VIPADistribute statement. By placing the definition of cluster-wide ports into the VIPA-Distribute definition, the specification of cluster-wide ports may be limited to distributed VIPAs. Similarly, keywords other that CLUSTERPORTS, for example, SYSPLEXPORTS, may be utilized to specify cluster-wide ports.

As described above, collaboration among cluster communication protocol stacks may be needed to ensure unique connection 4-tuples when multiple instances of the same application, running on multiple stacks, connect to the same external server (same external IP address and port). This coordination may be accomplished using the coupling facility 40 or other shared-memory facility. A structure may be defined for the CF 40 for this purpose, with an entry for each unique DVIPA. The entry will contain a structure (which could, for example, be a bit map) that indicates which ephemeral ports are currently in use for outbound TCP connections using the DVIPA as a source IP address.

Figure 10:
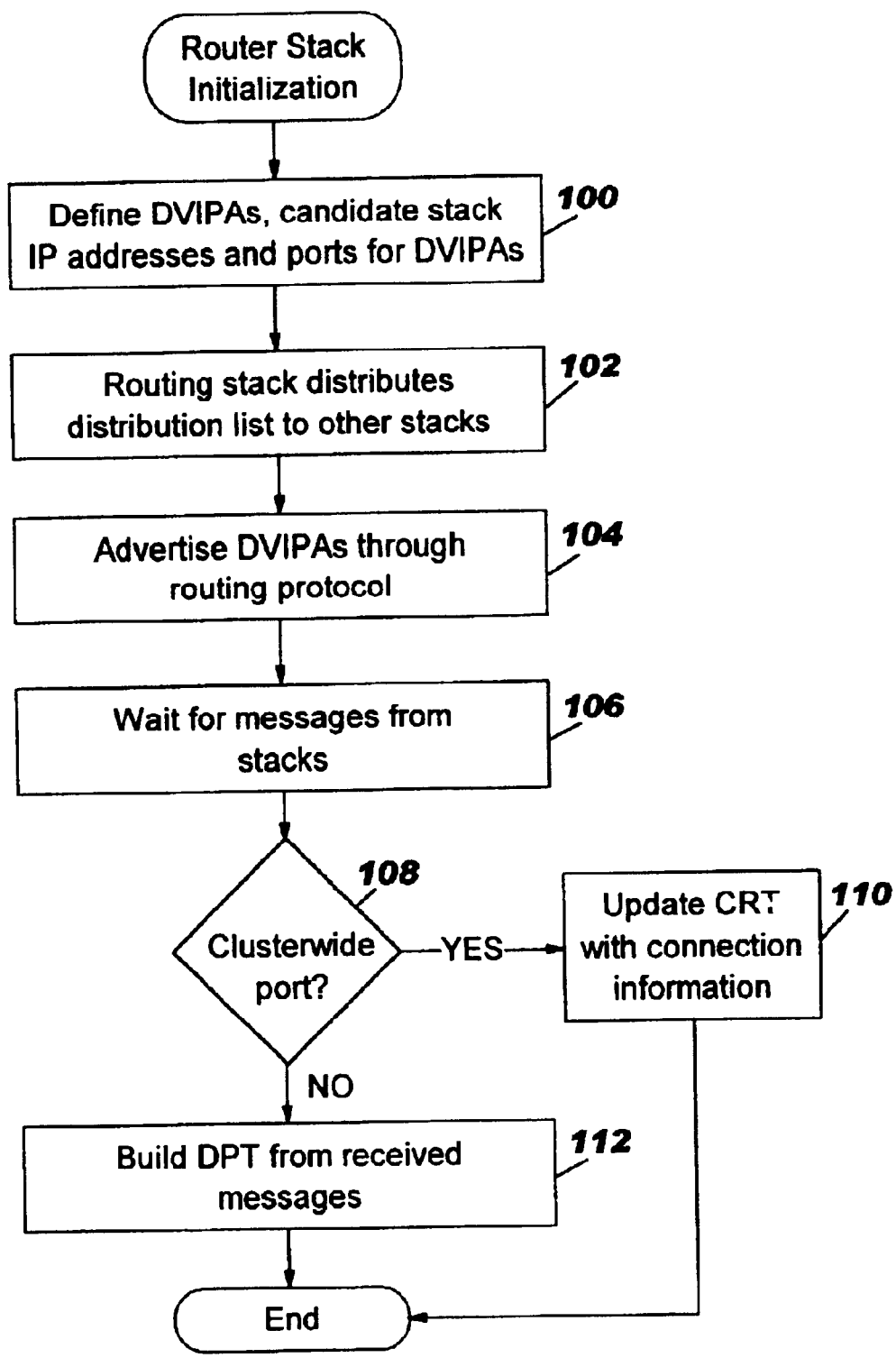
FIG. 10 is a flowchart illustrating operations for initialization of a routing protocol stack incorporating embodiments of the present invention.

With the above scenario in mind, embodiments of the present invention will now be described with reference to FIGS. 10 through 15 which are flowchart illustrations of operations of protocol stacks incorporating embodiments of the present invention. FIG. 10 illustrates operations of a routing communication protocol stack, such as the protocol stacks 22 and 38 in FIG. 9 in the present example. As seen in FIG. 10, the dynamic routable VIPA is defined as described above to include the candidate target stack XCF IP addresses and the enumerated ports or no ports enumerated and, thus, all ports, for the DVIPA (block 100). In the present example, the protocol stack 22 has DVIPA DVA1 identified as the dynamic routable VIPA, any port is routable and the candidate target stacks are communication protocol stacks corresponding to XCF addresses XCF1, XCF2, and XCF4. The protocol stack 38 has DVIPA DVB1 identified as the dynamic routable VIPA, port 60 is routable and the candidate target stacks are specified by the "ALL" value and may be any stack in the cluster. Furthermore, cluster-wide port assignments are provided for DVB1.

The routing communication protocol stack distributes the list of DVIPAs, ports and candidate target stacks to each of the stacks in the cluster (block 102). Such a distribution may be carried out by, for example, broadcasting the information as part of a VIPA_list as is utilized in VIPA takeover. In the present example, communication protocol stacks 22 and 38 would distribute their information to the other communication protocol stacks 22, 26, 30, 34 and 38. The routing communication protocol stacks 22 and 38 also advertise their respective DVIPAs as IP addresses through the routing protocol utilized to communicate with the network 44 (block 104). Alternatively, ownership of the DVIPAs for communications on the network 44 may be established through the IP Assist function of Queued Direct I/O for OSA Express adapters.

The routing communication protocol stacks also wait for messages from the other communication protocol stacks which identify applications which are bound to their DVIPAs and listen on an enumerated port or any port (block 106). As the messages are received, the routing communication protocol stack determines if the message is associated with a cluster-wide port assignment (block 108). If not, the routing communication protocol stack builds a Destination Port Table (DPT) which identifies those stacks having instances of applications bound to the DVIPA and listening on an enumerated port or any port (block 112). Alternatively, if the message is associated with a cluster-wide port assignment (block 108), the connection routing table may be directly modified to reflect the IP address and port (block 110) such that subsequent connection requests may be routed directly to the associated communication protocol stack. For example, an entry may be made in the connection routing table with the source IP address and port set to zero so as to identify the entry as associated with a cluster-wide port. Thus, the routing communication protocol stacks, such as the communication protocol stacks 22 and 38, are notified of which communication protocol stacks have applications bound to the DVIPA and which are available to distribute connections to the DVIPA so as to balance workload between the applications or, alternatively, if a unique port of the DVIPA is associated with a communication protocol stack such that workload distribution may be bypassed.

Figure 11:
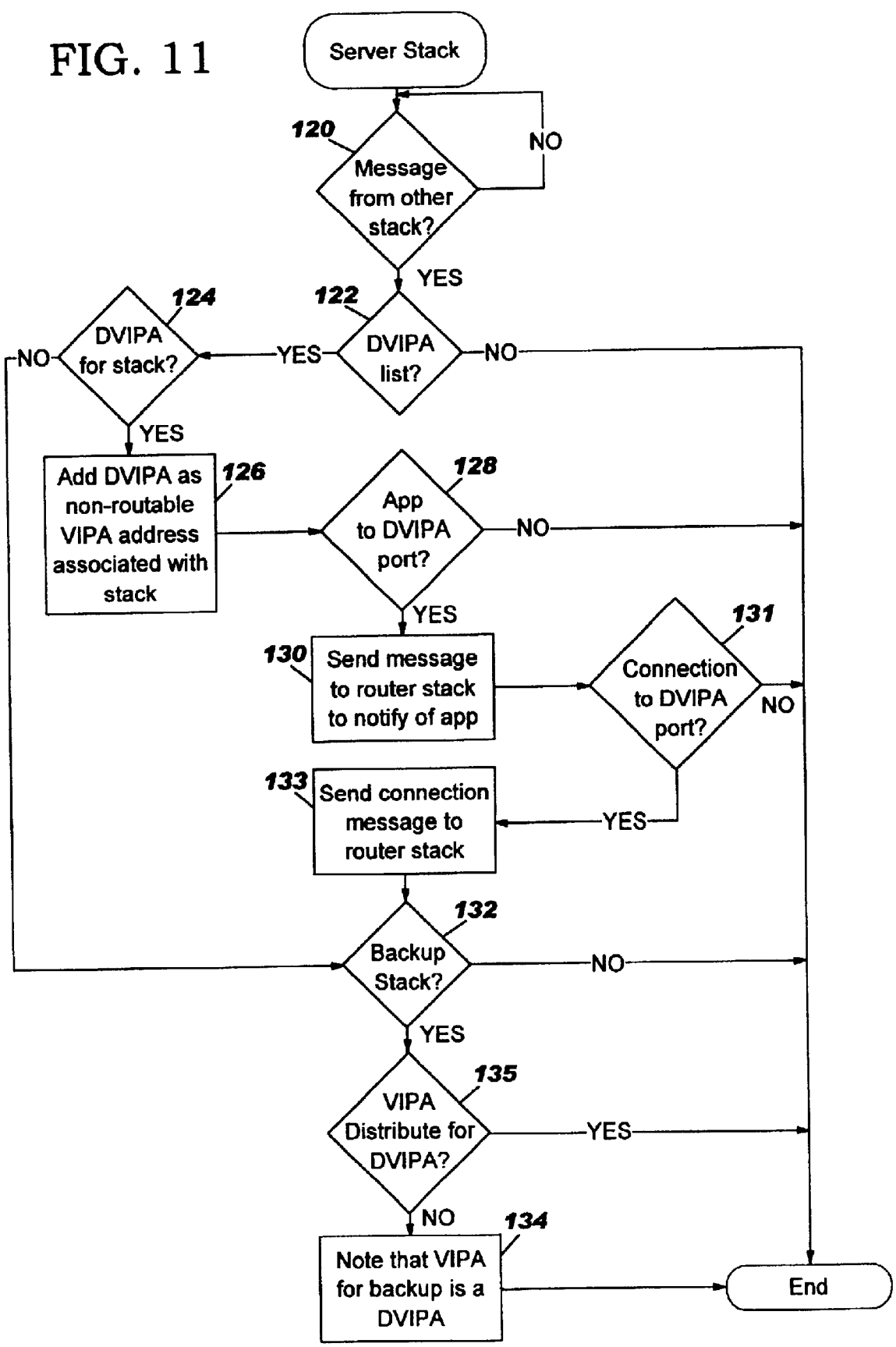
FIG. 11 is a flowchart illustrating operations of a server protocol stack according to embodiments of the present invention.

FIG. 11 illustrates operations carried out by a VIPA distribution function 23 of a communication protocol stack upon receiving a message from another communication protocol stack. As seen in FIG. 11, when a protocol stack receives a message (block 120), the protocol stack determines if the message contains a VIPA list (block 122). If not, operations of the VIPA distribution function 23 terminate. If DVIPA information is present in the message, then the VIPA distribution function 23 determines if the communication protocol stack is identified as a candidate target stack for the DVIPA (block 124). If the communication protocol stack is a candidate target stack, either as a result of being expressly enumerated in a list or because the "ALL" parameter is specified for the DVIPA, then the protocol stack adds the DVIPA as a non-advertised or internal VIPA address (i.e. not advertised to the routing protocol), if it is not already active as such, which may be utilized by the communication protocol stack in a manner similar to a loopback address (block 126).

The communication protocol stack also monitors the addresses and ports associated with application instances utilizing the protocol stack and, if an application utilizing the protocol stack is bound or binds to the DVIPA and listens on a port identified in the VIPA list as a DVIPA port (block 128), the protocol stack sends a message to the routing communication protocol stack associated with the DVIPA to notify the routing communication protocol stack that communications may be routed to the application through the candidate target stack (block 130). Such candidate target protocol stacks which have applications bound to the DVIPA and listening on a port associated with the DVIPA for which workload distribution is utilized may be referred to as a "current actual target" and, as described above, are identified in the DPT of the routing communication protocol stack as available for receiving connections. Where the application is bound to a DVIPA and is listening on a unique port the routing communication protocol stack may directly update its connection routing table as described above. A message may also be sent if an application instance bound to a DVIPA and listening to a port identified in the VIPA list, either as an enumerated port or as any port, terminates so that the VIPA distribution function 23 of the routing communication protocol stack may maintain an up-to-date DPT and/or connection routing table. While the sending of a message to notify the routing communication protocol stack of the existence of an application bound to the DVIPA and listening to a port of the DVIPA is illustrated in FIG. 11 as responsive to receiving a message from the routing communication protocol stack, as will be appreciated by those of skill in the art, once the DVIPA is active, such messages could be sent any time the candidate target stack detects that an application is bound to the DVIPA and listening on a DVIPA port.

Furthermore, the candidate target protocol stack may also determine if there are any active connections to the DVIPA (block 131). If so, then a connection message may be sent to the routing protocol stack (block 133) to notify it of the existence of the connection. In such a manner the routing protocol stack may incorporate the connection in its current routing table as described herein. Such a connection message may allow for movement of connections between routing protocol stacks, for example, to recover from a failure of a routing protocol stack.

Irrespective of whether a communication protocol stack is a candidate target stack or a current actual target stack, a communication protocol stack may be a backup for a routing communication protocol stack. Thus, as seen at block 132, the communication protocol stack may determine if it is a backup for the routing communication protocol stack associated with the VIPA list. The backup routing communication protocol stack may also determine it if has its own VIPADISTribute statement such that it would override the VIPA list information (block 135). If so, then the communication protocol stack need not maintain the VIPA list information as it will use its own information. Otherwise, the backup communication protocol stack maintains the information from the VIPA list so as to perform backup operations in the event of failure of the primary routing stack (block 134). Thus, the backup protocol stack may utilize a different distribution pattern than the primary protocol stack. Such differences may allow for reducing the disruption of a failed stack until the failed stack may be restored by, for example, adding candidate target stacks that are only utilized when a failure of the routing stack occurs.

In the present example illustrated in FIG. 9, the protocol stack 22 of MVS1 would broadcast a VIPA list (DVIPA_list_1) identifying MVS1 as the primary routing communication protocol stack, DVA1 as a dynamic routable VIPA with any port as an associated port and the communication protocol stacks 22, 26 and 34 as candidate target communication protocol stacks. Additionally, the protocol stack 38 of MVS5 would broadcast a VIPA list (DVIPA_list_2) identifying MVS1 as the primary routing communication protocol stack, DVB1 as a dynamic routable VIPA with port 60 as an associated port and cluster-wide port assignment and all of the communication protocol stacks 22, 26 30, 34 and 38 as candidate target communication protocol stacks.

When, for example, communication protocol stack 26 receives DVIPA_list_1, it examines the list and determines that it is identified as a candidate target stack. Thus, the VIPA distribution function 23 of communication protocol stack 26 adds the DVIPA DVA1 as a non-routable VIPA and determines if an application is executing which is bound to DVA1 and listening to port 60. For purposes of the present example, APP A is bound to DVA1 and listening to port 60 so the communication protocol stack 26 sends a SRVSTAT message to communication protocol stack 22 identifying itself as a current actual target. The VIPA distribution function 23 of the communication protocol stack 22 incorporates the XCF address of the communication protocol stack 22 into its DPT. Messages to port 60 of the DVIPA may then be routed to the communication protocol stack 26. Because no connections exist at this time a NEWCONN message is not sent.

When the communication protocol stack 30 receives DVIPA_list_1, it examines the list and is not identified as a candidate target stack or as a backup to the communication protocol stack 22 and may disregard the list. When the communication protocol stack 38 receives DVIPA_list_1, it examines the list and is not identified as a candidate target stack but is identified as a backup to the communication protocol stack 22. Thus, the communication protocol stack 38 stores the list for use in error recovery.

When any of the communication protocol stacks 22, 26, 30, 34 and 38 receive the DVIPA_list_2, then note that the "ALL" parameter is identified and add the DVIPA DVB1 as a non-routable VIPA. These communication protocol stacks 22, 26, 30, 34 and 38 monitor for applications bound DVB1 and listening on port 60 to determines if an application is executing which is bound to DVA1 and listening to port 60. If and when such an application binds to DVB2 and listens on port 60 a SRVSTAT message is sent to the communication protocol stack 38 to identify the candidate target stack as a current actual target as described above. Furthermore, if a communication protocol stack is subsequently activated, it too will identify DVB1 as a DVIPA and add DVB1 as a non-routable VIPA.

Figure 12:
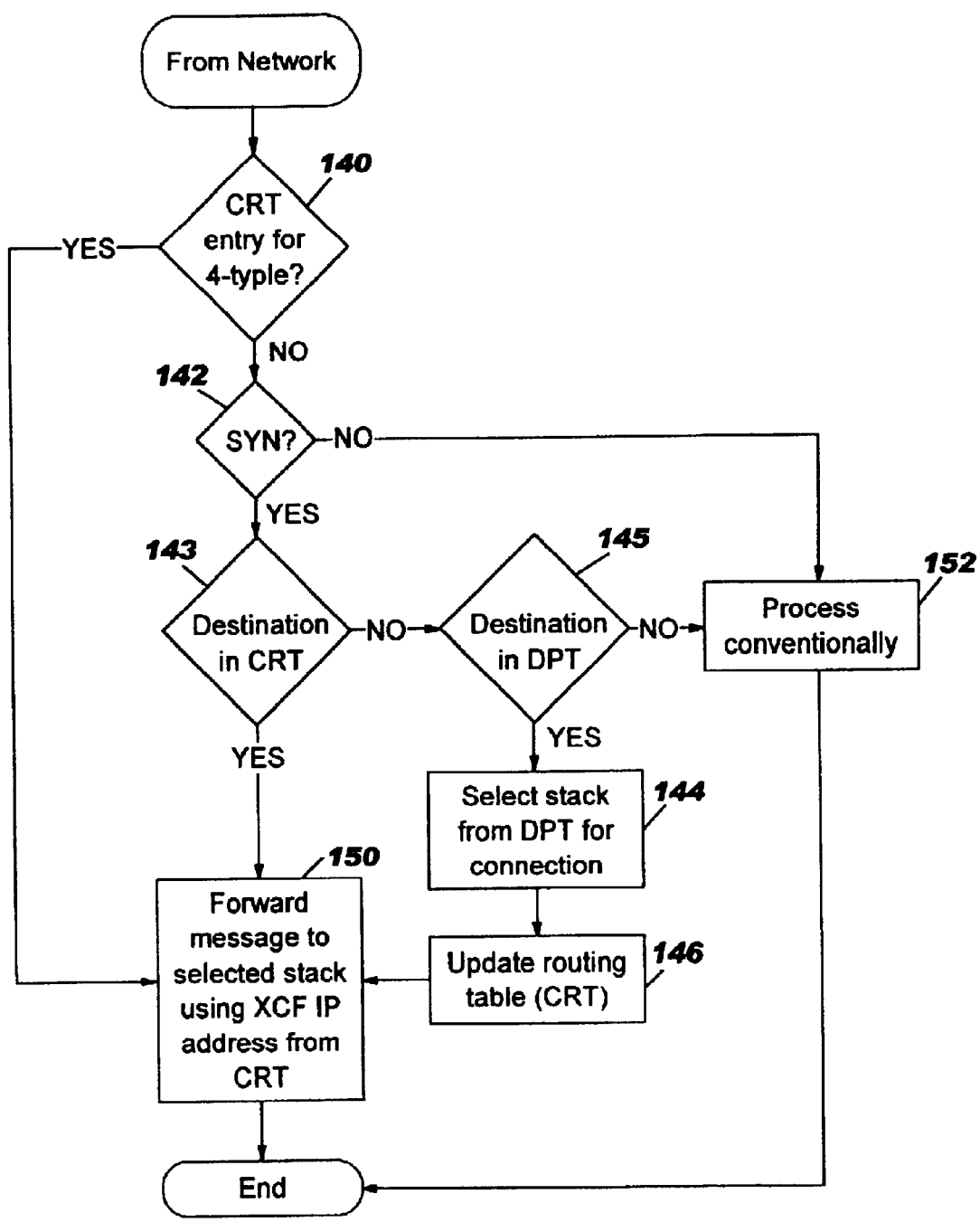
FIG. 12 is a flowchart illustrating operations for a incoming communications to the routing protocol stack according to embodiments of the present invention.

FIG. 12 illustrates operations of a routing communication protocol stack when a communication is received from the network 44. As is seen in FIG. 12, the VIPA distribution function 23 of the communication protocol stack searches its connection routing table to determine if an entry exists for the 4-tuple of source IP address, source port, destination IP address and destination port (block 140). If an entry exists for the 4-tuple in the CRT, that entry is utilized to route the incoming communication to a target stack (block 150).

If there is no entry for the complete 4-tuple in the CRT, the VIPA distribution function 23 determines if the communication is a SYN to establish a connection (block 142). If not, the communication may be process conventionally (block 152), for example, by passing the communication to the TCP portion of the communication protocol stack. If the communication is a SYN (block 142), the VIPA distribution function 23 searches the CRT for an entry for the 4-tuple with the source IP address and port set to zero and the destination IP address and port of the SYN (block 143). If an entry exists for the destination IP address and port in the CRT, that entry is utilized to route the incoming communication to a target stack (block 150).

If no entry exists in the CRT for the destination IP address and port (block 142), the VIPA distribution function 23 determines if a DPT entry exists for the destination IP address and port (block 145). If no DPT entry exists (block 145), the SYN is processed conventionally (block 152). If a DPT entry exists (block 145), the VIPA distribution function selects a current actual target for the connection (i.e. a communication protocol stack with an application bound to the DVIPA and listening to the port specified by the communication which is not a unique port) (block 144). Such a selection may, for example, be based on predefined criteria, utilizing a predefined selection pattern, such as round-robin, weighted round-robin or the like, or may be based on dynamic criteria, policies or combinations thereof. For example, the selection may be made to distribute workload between the candidate target stacks. Thus, a workload manager and/or a service policy agent may be consulted in selecting the candidate target stack.

However the selection is made, the VIPA distribution function 23 updates a current routing table (CRT) which defines the path from the routing communication protocol stack to the selected current actual target (block 146). Such an update may take the form of creating an entry incorporating the source IP address, DVIPA and port and the XCF address of the selected current actual target. The message is also forwarded to the selected current actual target using the XCF address of the current actual target (block 150).

Figure 13:
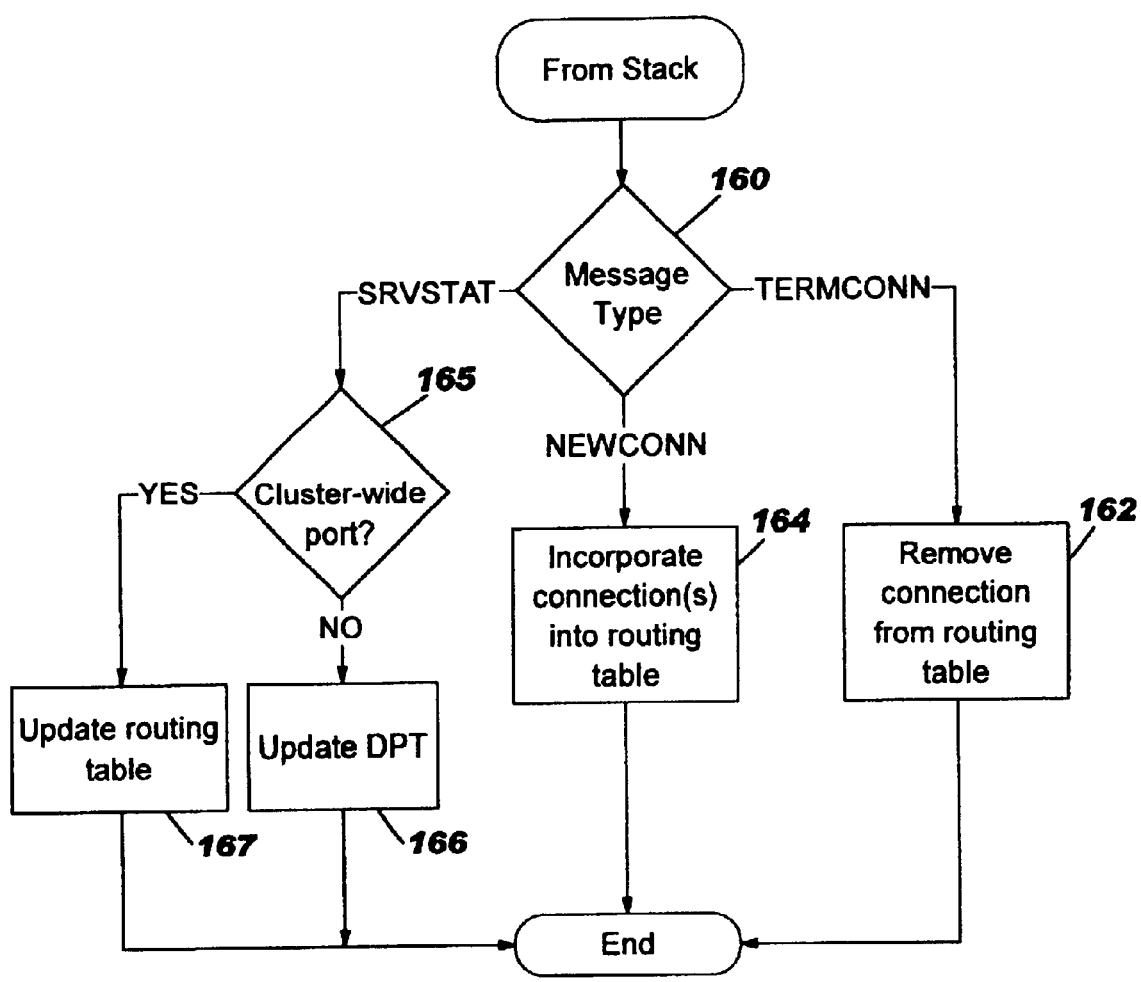
FIG. 13 is a flowchart illustrating operations of a routing protocol stack receiving communications from another protocol stack according to embodiments of the present invention.

FIG. 13 illustrates operations of the VIPA distribution function 23 of the routing communication protocol stack when a message is received from another communication protocol stack. As is seen in FIG. 13, the VIPA distribution function 23 determines the type of message received (block 160). If the message is a SRVSTAT message, then, as described above, it is determined if the message is associated with a cluster-wide port (block 165). If not, the application and communication protocol stack entries of the DPT are updated (block 166) by the VIPA distribution function 23. If the message is associated with a cluster-wide port (block 165), the application and communication protocol stack entries of the connection routing table are updated (block 167) by the VIPA distribution function 23. As described above, the SRVSTAT message may be sent by a communication protocol stack both when an application instance binds to the DVIPA and listens to an associated port and when the application instance terminates. Thus, the SRVSTAT message may be utilized by the VIPA distribution function 23 to maintain the connection routing table (block 167) and/or the DPT with up-to-date information as to the current actual targets available for connections (block 166).

Returning to block 160, the VIPA distribution function 23 may also determine if the message is a new connection message (NEWCONN). Such a message may be generated if an application bound to a DVIPA utilizing a port in the VIPA list initiates a connection or, as described above, if a communication protocol stack receives a VIPA list with a DVIPA which already have applications using the DVIPA for connections, then the VIPA distribution function 23 of the communication protocol stack sends a NEWCONN message to the routing communication protocol stack to notify the routing communication protocol stack of the connection. If the message is a NEWCONN message, then the VIPA distribution function 23 incorporates the connection into the CRT (block 164). Such an incorporation of the connection into the CRT may be carried out as described above for connections originated from network 44.

A third type of message which may be received by the VIPA distribution function 23 is a connection termination message (TERMCONN). Such a message may be generated by a VIPA distribution function 23 when a connection terminates. When the connection terminates, the VIPA distribution function 23 of the communication protocol stack sends a TERMCONN message to the routing communication protocol stack to notify the routing communication protocol stack that the connection has ended and routing for the connection may be discontinued. Thus, if the message is a TERMCONN message (block 160), then the VIPA distribution function 23 removes the connection from the CRT (block 162). Such a removal of the connection from the CRT may be carried out by, for example, deleting or invalidating an entry in the CRT corresponding to the connection.

Returning to the example illustrated in FIG. 9, when a SYN message to any port of DVA1 is received from network 44 by communication protocol stack 22, the VIPA distribution function 23 determines that the SYN is to a dynamic routable VIPA for which it is the routing communication protocol stack, consults its DPT and optionally a workload management function (not shown) and selects a current actual target as a destination for the message. Thus, the VIPA distribution function 23 of the communication protocol stack 22 may select the communication protocol stack 26 as a destination. The communication protocol stack 22 creates an entry for the connection in its CRT and forwards the message to the communication protocol stack 26. Subsequent messages from the network 44 to port 60 of DVA1 from the source IP address will also be routed to the communication protocol stack 26 using the CRT entry.

An instance of APP A of the communication protocol stack 26 bound to DVA1 and utilizing port 60 may also establish a connection over network 44 either directly or through another protocol stack. When such occurs, the VIPA distribution function 23 of communication protocol stack 26 sends a NEWCONN message to the routing communication protocol stack 22 identifying the new connection. The VIPA distribution function 23 of communication protocol stack 22 receives the NEWCONN message and updates its CRT to route communications from the identified new connection to port 60 of DVA1 to the communication protocol stack 26. Such an identification may be made by, for example, providing the source IP address of the other end of the connection, the DVIPA and port and the XCF address of the communication protocol stack 26 to the routing communication protocol stack 22.

In any event, when either of the connections ends, the VIPA distribution function 23 of the communication protocol stack 26 sends a TERMCONN message to the VIPA distribution function 23 of the communication protocol stack 22. The VIPA distribution function 23 of the communication protocol stack 22 removes the entry from the CRT corresponding to the function and, thereby, terminates routing for the connection.

When APPB binds to a cluster-wide port of DVB1, routing communication protocol stack 38 is notified. When a SYN message to a cluster-wide port of DVB1 is received from network 44 by communication protocol stack 38, the VIPA distribution function 23 determines that the SYN is to a unique port of the dynamic routable VIPA for which it is the routing communication protocol stack, consults its CRT and selects a current actual target as a destination for the message. The current and subsequent messages from the network 44 to the cluster-wide port of DVB1 will also be routed to the communication protocol stack 26 using the CRT entry.

As mentioned above, cluster-wide port assignment may be provided by maintaining in a common storage an identification of used ports. In the embodiments illustrated in FIG. 9, such may be provided by, for example, determining if CLUSTERPORTS is specified for a DVIPA being initialized. As described above, this may be accomplished by including the CLUSTERPORTS parameter in a VIPADEFine statement. If CLUSTERPORTS is specified, an entry may be created in a structure in the coupling facility 40 for the DVIPA or DVIPAs. As described above, the structure will keep track of the availability of ports for the DVIPA. In particular, the structure may take the form of a bitmap for each DVIPA with each bit corresponding to a port such that, for example, a "1" in the bit location indicates a port is available and a "0" indicates that a port is unavailable.

It is also determined if the DVIPA is a distributed DVIPA. Such may be the case, for example, if a VIPADISTribute statement is associated with the DVIPA. If the DVIPA is a distributed DVIPA, the connection routing table for the DVIPA may be searched on behalf of the target stacks to obtain port information for connections to the target stacks. If the CLUSTERPORTS parameter is added via a VARY OBEY, the connection table of the communication protocol stack may be scanned for ports of active DVIPAs and the coupling facility updated with the port information obtained.

Alternatively, cluster-wide port assignment which may also provide for error recovery for distribute VIPAs (e.g. DRVIPAs) according to embodiments of the present invention by providing a cluster-wide port availability structure in the coupling facility 40 for each DVIPA for which CLUSTERPORTS is specified and a stack specific port usage structure which indicates which ports are used by which stacks for which the DVIPA is defined. The stack specific port information may be used in the event of the failure of a stack to update the cluster-wide port availability structure to make the ports of the failed stack available for use.

While particular messages are described in FIG. 13 as being associated with notification regarding a cluster-wide port, other messages may also be utilized. For example, different message types may be utilized for sending information to be placed in the routing table and for sending information to be placed in the DPT. Thus, the message type itself may indicate where the information is to be place. Similarly, NEWCONN messages, rather than SRVSTAT messages, could be utilized to send information for cluster-wide ports. Thus, embodiments of the present invention should not be construed as limited to the particular messaging scenario illustrated in FIG. 13.

Figure 14:
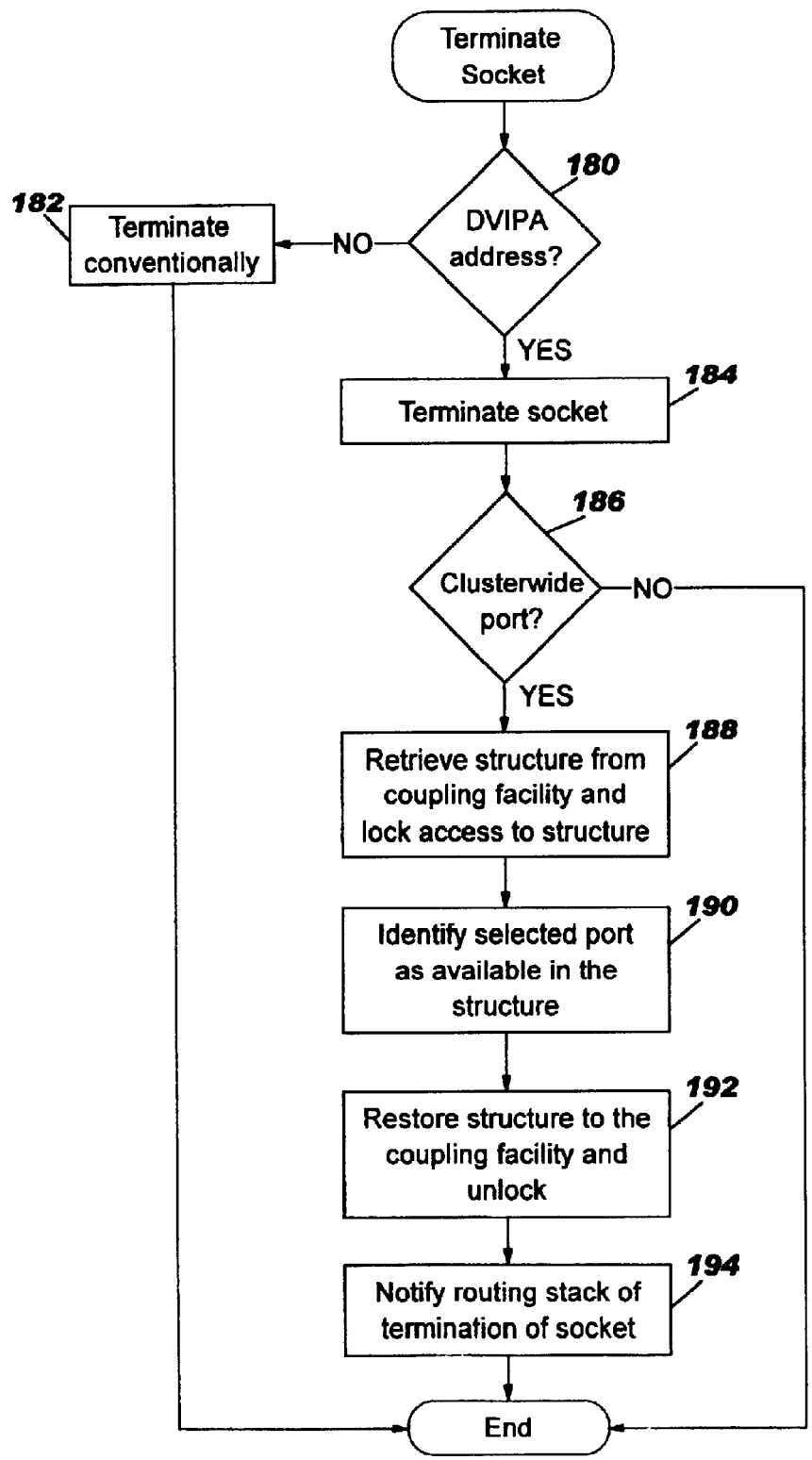
FIG. 14 is a flowchart illustrating operations for termination of a socket utilizing cluster-wide port assignment according to embodiments of the present invention.

FIG. 14 illustrates operations according to embodiments of the present invention when a listening socket is terminated, for example, by termination of an application. As seen in FIG. 14, it is determined if the listening socket is associated with a DVIPA (block 180). If not, conventional termination operations may be utilized (block 182). If the socket is associated with a DVIPA (block 180), the socket is terminated and appropriate tables are updated as would be the case with a conventional DVIPA (block 184). It is also, however, determined if CLUSTERPORTS is specified for the DVIPA (block 186). If not, no additional operation need be performed. If CLUSTERPORTS is specified (block 186), the structure or structures by which port assignments are tracked are retrieved from the coupling facility 40 and access to the structure(s) is locked (block 188). The structure or structure(s) are updated to identify the port of the socket which is terminating as available (block 190). Additionally, the port may be identified as available in the cluster-wide structure and not in use in the stack specific structure(block 190). The structure or structures are restored to the coupling facility 40 and unlocked to allow other communications protocol stacks access to the structure(s) (block 192). Additionally, a message is sent to the routing communication protocol stack indicating termination of the socket (block 194).

Figure 15:
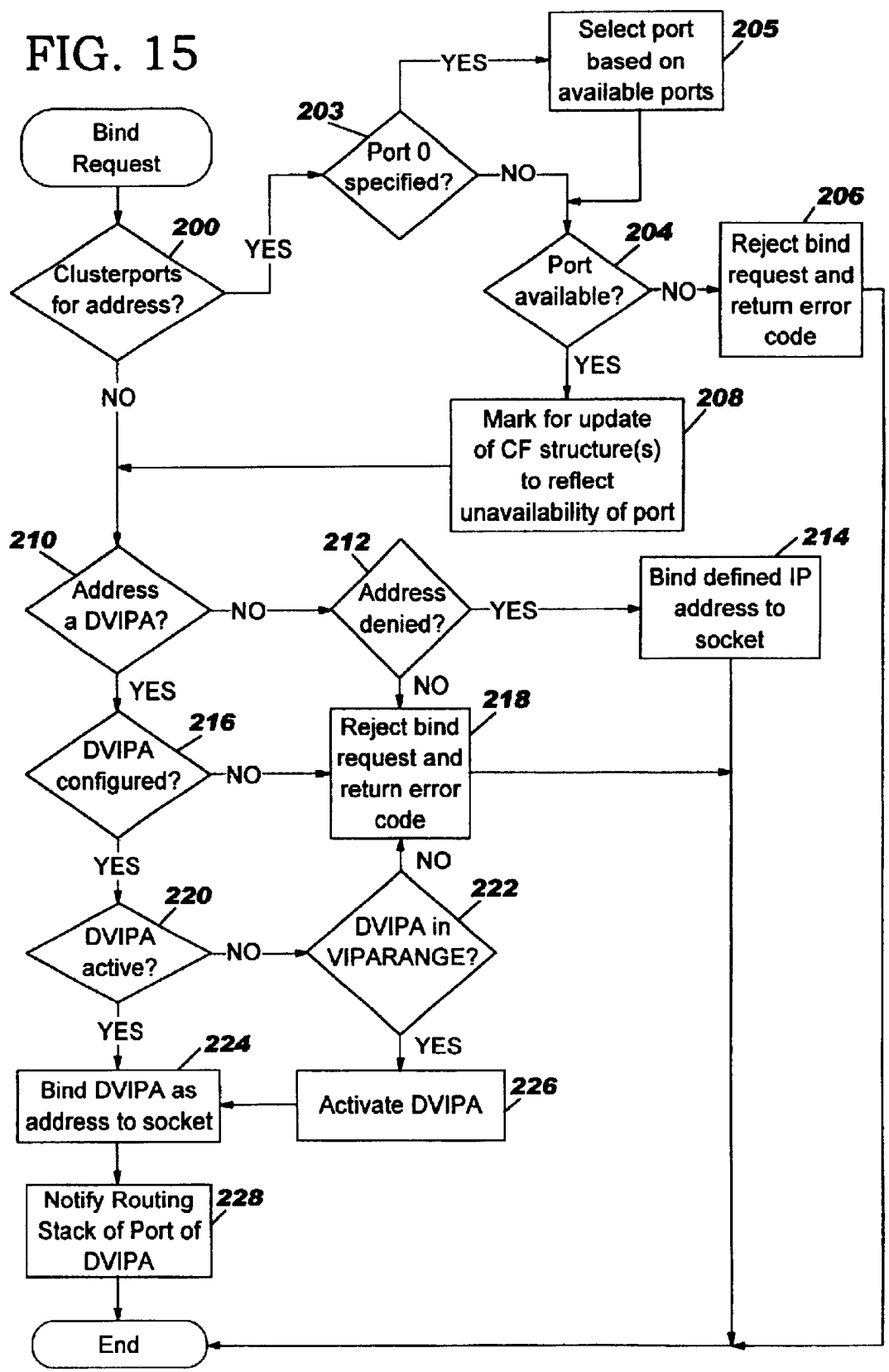
FIG. 15 is a flowchart illustrating operations according to embodiments of the present invention when a bind operation is requested by an application

FIG. 15 illustrates operations according to embodiments of the present invention when a communication protocol stack receives a bind request from an application. As seen in FIG. 15, the communication protocol stack may determine if CLUSTERPORTS is defined for the address to which the bind request is directed (block 200). If CLUSTERPORTS is specified (block 200), it is determined if port 0 is specified (block 203). If port 0 is not specified (block 203) the structure in the coupling facility 40 that indicates port availability is checked to determine if the specified port is available (block 204). If port 0 is specified (block 203), then an available port is selected based on the port availability identified in the coupling facility 40 (block 205). If the specified port other than port 0 is not available (block 204), the bind request is rejected and an error code is returned to the requesting application (block 206). If port 0 is specified and no port is available (block 204), the bind request fails (block 206). If the a port or the specified port is available (block 204), the bind request may be marked to update the coupling facility 40 to reflect that the port is in use if the bind operation is successful and, in embodiments having stack specific structures in the coupling facility 40, the stack specific structure would also be updated (block 208).

If the bind request is not rejected due to specification of an unavailable port (blocks 203, 204 and 208), then it is determined if the address is a DVIPA (block 210). If the specified address in the bind request is not a DVIPA (block 210), it is determined if the specified address has previously been defined for the communication protocol stack receiving the request (block 212). If not, an error code may be returned in response to the bind request (block 218) and operations terminate. If the specified address has previously been defined for the communication protocol stack receiving the request (block 212), the bind operation is completed using the specified address and, if the request is marked for update of the coupling facility 40 (see block 208), the coupling facility is updated to reflect that the port specified in the bind request is not available (block 214).

Returning to block 210, if the specified address in the bind request is a DVIPA, it is determined if the DVIPA has been configured on the communication protocol stack receiving the request (block 216). If not, an error code may be returned in response to the connection request (block 218) and operations may be terminated. If the DVIPA is configured (block 216), it is determined if the DVIPA is active on the communication protocol stack receiving the request (block 220). If the DVIPA is active, the DVIPA is used as the source address for the connection and if the bind is marked to update the coupling facility to indicate that the port is used, the coupling facility is updated (block 224). A message is also sent to the routing communication protocol stack identifying the address and port to which the application is bound as a unique port if cluster ports is specified (block 228). If not, it is determined if the DVIPA is within a range of a VIPARANGE statement for the communication protocol stack (block 222). If not, an error code may be returned (block 218) and operations may be terminated. If the DVIPA is within a range of a VIPARANGE statement for the communication protocol stack (block 222), the DVIPA is activated (block 226) and the bind operation is completed using the DVIPA as the source address and, if the request is marked for update of the coupling facility 40 (see block 208), the coupling facility is updated to reflect that the port specified in the bind request is not available and a message sent to the routing communication protocol stack identifying the address and port to which the application is bound as a unique port if cluster ports was specified (block 228).

Operations for accessing the coupling facility are generally described above with reference to FIG. 15. Operations for accessing the coupling facility are illustrated, for example, in blocks 188 to 192 of FIG. 14. As seen in FIG. 14, when the coupling facility is accessed, the structure in the coupling facility is locked, the structure is retrieved, updated and returned to the coupling facility. The lock of the structure may then be removed to allow other protocol stacks to access the structure. Thus, in FIG. 15, structure may be locked when it is first retrieved and updated, restored in the coupling facility and unlocked upon successful completion of the bind operation in block 224.

While operations for performing a bind operation are illustrated in FIG. 15 in a particular order, other sequences of operations could also be utilized. For example, block 210 could check for an active DVIPA and, if active, operations could continue at block 224 with completion of the bind operation using the active DVIPA. If the address was not an active DVIPA the operations at block 212 and after could be modified to be determined if the address was defined as a static VIPA or if it was defined in a VIPARANGE statement. If the address was a static VIPA it would be used to complete the bind operation. If the address was defined by a VIPARANGE statement the DVIPA would be activated. Thus, embodiments of the present invention should not be construed as limited to the particular sequence of operations illustrated in FIG. 15.

For example, if an application binds to an ephemeral port, such as by specifying port 0 in a bind request, and CLUSTERPORTS is specified for the IP address of the bind request, a unique port may be identified through the structures in the coupling facility and a listening socket established utilizing this unique port. The routing communication protocol stack would be notified of such a bind so that the CRT may be updated so that workload distribution may be bypassed and connection requests to the listening socket may be routed directly to the communication protocol stack of the application.

While embodiments of the present invention have been described with reference to broadcasting a VIPA_list to all protocol stacks and that the VIPA_list includes information about each candidate stack, in other embodiments of the present invention, VIPA_lists may be provided for each candidate stack with information about the specific candidate stack. In such embodiments, specific VIPA_lists may be sent to individual candidate stacks rather than being broadcast to all candidate stacks. Thus, candidate stacks may only have knowledge of the distribution information that affects them.

As used herein, the term "connection administration message" refers to messages between communication protocol stacks which are utilized to manage the routing of TCP/IP messages between the communication protocol stacks. Thus, for example, the NEWCONN, TERMCONN and VIPA lists may be considered connection administration messages.

Embodiments of the present invention have been described with reference to FIGS. 4 through 15 which are flowcharts and/or block diagrams illustrating aspects of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagram block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and/or block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

While the present invention has been described with respect to the VIPA distribution function and/or cluster-wide port assignment function as a part of the communication protocol stack, as will be appreciated by those of skill in the art, such functions may be provided as separate functions, objects or applications which may cooperate with the communication protocol stacks. Furthermore, the present invention has been described with reference to particular sequences of operations. However, as will be appreciated by those of skill in the art, other sequences may be utilized while still benefitting from the teachings of the present invention. Thus, while the present invention is described with respect to a particular division of functions or sequences of events, such divisions or sequences are merely illustrative of particular embodiments of the present invention and the present invention should not be construed as limited to such embodiments.

Furthermore, while the present invention has been described with reference to particular embodiments of the present invention in a System/390 environment, as will be appreciated by those of skill in the art, the present invention may be embodied in other environments and should not be construed as limited to System/390 but may be incorporated into other systems, such as a Unix or other environments by associating applications or groups of applications with an address rather than a communications adapter. Thus, the present invention may be suitable for use in any collection of data processing systems which allow sufficient communication to all of for the use of dynamic virtual addressing. Accordingly, specific references to System/390 systems or facilities, such as the "coupling facility," "ESCON," "Sysplex" or the like should not be construed as limiting the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of communicating with a plurality of application instances executing on a cluster of data processing systems utilizing a single Internet Protocol (IP) address, the method comprising the steps of:

notifying a distributing data processing system if an application opens a listening socket utilizing any port of multiple ports associated with the single IP address;

identifying potential target data processing systems in the cluster of data processing systems at the distributing data processing system based on the notification;

receiving a request to establish a connection to the single IP address and a port of the multiple ports associated with the single IP address at the distributing data processing system;

selecting a data processing system from the potential target data processing systems if the port associated with the request is a port of the multiple ports associated with the single IP address associated with a potential data processing system; and routing communications for the connection to the selected data processing system.

2. The method according to claim 1, wherein the step of selecting a data processing system comprises selecting a data processing system to distribute workload between the potential target data processing systems.

3. The method according to claim 1, wherein the distributing data processing system comprises a routing communication protocol stack.

4. A method of communicating with a plurality of application instances executing on a cluster of data processing systems utilizing a single Internet Protocol (IP) address, the method comprising the steps of:

notifying a distributing data processing system if an application opens a listening socket utilizing any port associated with the single IP address;

identifying potential target data processing systems in the cluster of data processing systems at the distributing data processing system based on the notification;

receiving a request to establish a connection to the single IP address and a port associated with the single IP address at the distributing data processing system;

selecting a data processing system from the potential target data processing systems if the port associated with the request is associated with a potential data processing system;

routing communications for the connection to the selected data processing system;

notifying a distributing data processing system if an application opens a listening socket utilizing an enumerated port if ports associated with the single IP address are enumerated; and wherein notifying the distributing data processing system if an application opens a listening socket utilizing any port associated with the single IP address comprises notifying the distributing data processing system if an application opens a listening socket utilizing any port associated with the single IP address if ports are not enumerated.

5. A method of communicating with a plurality of application instances executing on a cluster of data processing systems utilizing a single Internet Protocol (IP) address, the method comprising the steps of:

notifying a distributing data processing system if an application opens a listening socket utilizing any port associated with the single IP address;

identifying potential target data processing systems in the cluster of data processing systems at the distributing data processing system based on the notification;

receiving a request to establish a connection to the single IP address and a port associated with the single IP address at the distributing data processing system;

selecting a data processing system from the potential target data processing systems if the port associated with the request is associated with a potential data processing system;

routing communications for the connection to the selected data processing system;

notifying a distributing data processing system if an application opens a listening socket utilizing an enumerated port of the single IP address if ports associated with the single IP address are enumerated irrespective of whether the listening socket is opened with the single IP address specifically identified; and wherein notifying the distributing data processing system if an application opens a listening socket utilizing any port associated with the single IP address comprises notifying the distributing data processing system if an application opens a listening socket utilizing any port associated with the single IP address if the listening socket is opened with the single IP address specifically identified.

6. The method according to claim 5, further comprising:

receiving at the data processing system in the cluster of data processing systems a definition that the single IP address is a distributed address from the distributing data processing system, wherein the definition includes an indication of whether ports associated with the single IP address which are to be distributed are enumerated; and evaluating the definition to determine if the ports associated with the single IP address are enumerated.

7. A method of communicating with a plurality of application instances executing on a cluster of data processing systems utilizing a single Internet Protocol (IP) address, the method comprising the steps of:

notifying a distributing data processing system if an application opens a listening socket utilizing any port associated with the single IP address;

identifying potential target data processing systems in the cluster of data processing systems at the distributing data processing system based on the notification;

receiving a request to establish a connection to the single IP address and a port associated with the single IP address at the distributing data processing system;

selecting a data processing system from the potential target data processing systems if the port associated with the request is associated with a potential data processing system;

routing communications for the connection to the selected data processing system;

determining if a port associated with the received request is a unique port associated with a listening socket of an application on a data processing system within the cluster has a port associated;

selecting the data processing system associated with the unique port as a destination data processing system for the request; and routing the request to the destination data processing system.

8. The method according to claim 7, wherein determining if a port associated with the received request is a unique port comprises:

notifying the distributing data processing system if an application associated with a data processing system in the cluster of data processing systems opens a listening socket associated with the single IP address utilizing a unique port within the cluster of data processing systems so as to provide an identification of data processing systems associated with unique ports of the IP address; and determining if the port associated with the received request is a unique port associated with an identified data processing system.

9. The method according to claim 8, wherein the unique port comprises an ephemeral port.

10. A system for communicating with a plurality of application instances executing on a cluster of data processing systems utilizing a single Internet Protocol (IP) address, comprising:

means for notifying a distributing data processing system if an application opens a listening socket utilizing any port of multiple ports associated with the single IP address;

means for identifying potential target data processing systems in the cluster of data processing systems at the distributing data processing system based on the notification;

means for receiving a request to establish a connection to the single IP address and a port of the multiple ports associated with the single IP address at the distributing data processing system;

means for selecting a data processing system from the potential target data processing systems if the port associated with the request is a port of the multiple ports associated with the single IP address associated with a potential data processing system; and means for routing communications for the connection to the selected data processing system.

11. The system according to claim 10, wherein the means for selecting a data processing system comprises means for selecting a data processing system to distribute workload between the potential target data processing systems.

12. The system according to claim 10, wherein the distributing data processing system comprises a routing communication protocol stack.

13. A system for communicating with a plurality of application instances executing on a cluster of data processing systems utilizing a single Internet Protocol (IP) address, comprising:

means for notifying a distributing data processing system if an application opens a listening socket utilizing any port associated with the single IP address;

means for identifying potential target data processing systems in the cluster of data processing systems at the distributing data processing system based on the notification;

means for receiving a request to establish a connection to the single IP address and a port associated with the single IP address at the distributing data processing system;

means for selecting a data processing system from the potential target data processing systems if the port associated with the request is associated with a potential data processing system;

means for routing communications for the connection to the selected data processing system;

means for notifying a distributing data processing system if an application opens a listening socket utilizing an enumerated port if ports associated with the single IP address are enumerated; and wherein the means for notifying the distributing data processing system if an application opens a listening socket utilizing any port associated with the single IP address comprises means for notifying the distributing data processing system if an application opens a listening socket utilizing any port associated with the single IP address if ports are not enumerated.

14. A system for communicating with a plurality of application instances executing on a cluster of data processing systems utilizing a single Internet Protocol (IP) address, comprising:

means for notifying a distributing data processing system if an application opens a listening socket utilizing any port associated with the single IP address;

means for identifying potential target data processing systems in the cluster of data processing systems at the distributing data processing system based on the notification;

means for receiving a request to establish a connection to the single IP address and a port associated with the single IP address at the distributing data processing system;

means for selecting a data processing system from the potential target data processing systems if the port associated with the request is associated with a potential data processing system;

means for routing communications for the connection to the selected data processing system;

means for notifying a distributing data processing system if an application opens a listening socket utilizing an enumerated port of the single IP address if ports associated with the single IP address are enumerated irrespective of whether the listening socket is opened with the single IP address specifically identified; and wherein the means for notifying the distributing data processing system if an application opens a listening socket utilizing any port associated with the single IP address comprises means for notifying the distributing data processing system if an application opens a listening socket utilizing any port associated with the single IP address if the listening socket is opened with the single IP address specifically identified.

15. The system according to claim 14, further comprising:

means for receiving at the data processing system in the cluster of data processing systems a definition that the single IP address is a distributed address from the distributing data processing system, wherein the definition includes an indication of whether ports associated with the single IP address which are to be distributed are enumerated; and means for evaluating the definition to determine if the ports associated with the single IP address are enumerated.

16. A system for communicating with a plurality of application instances executing on a cluster of data processing systems utilizing a single Internet Protocol (IP) address, comprising:

means for notifying a distributing data processing system if an application opens a listening socket utilizing any port associated with the single IP address;

means for identifying potential target data processing systems in the cluster of data processing systems at the distributing data processing system based on the notification;

means for receiving a request to establish a connection to the single IP address and a port associated with the single IP address at the distributing data processing system;

means for selecting a data processing system from the potential target data processing systems if the port associated with the request is associated with a potential data processing system;

means for routine communications for the connection to the selected data processing system;

means for determining if a port associated with the received request is a unique port associated with a listening socket of an application on a data processing system within the cluster has a port associated;

means for selecting the data processing system associated with the unique port as a destination data processing system for the request; and means for routing the request to the destination data processing system.

17. The system according to claim 16, wherein the means for determining if a port associated with the received request is a unique port comprises:

means for notifying the distributing data processing system if an application associated with a data processing system in the cluster of data processing systems opens a listening socket associated with the single IP address utilizing a unique port within the cluster of data processing systems so as to provide an identification of data processing systems associated with unique ports of the IP address; and means for determining if the port associated with the received request is a unique port associated with an identified data processing system.

18. The system according to claim 16, wherein the unique port comprises an ephemeral port.

19. A computer program product for communicating with a plurality of application instances executing on a cluster of data processing systems utilizing a single Internet Protocol (IP) address, comprising:
- a computer readable storage media having computer readable program code embodied therein, the computer readable program code comprising:
- computer readable program code configured to notify a distributing data processing system if an application opens a listening socket utilizing any port of multiple ports associated with the single IP address;
- computer readable program code configured to identify potential target data processing systems in the cluster of data processing systems at the distributing data processing system based on the notification;
- computer readable program code configured to receive a request to establish a connection to the single IP address and a port of the multiple ports associated with the single IP address at the distributing data processing system;
- computer readable program code configured to select a data processing system from the potential target data processing systems if the port associated with the request is a port of the multiple ports associated with the single IP address associated with a potential data processing system; and
- computer readable program code configured to route communications for the connection to the selected data processing system.

20. The computer program product according to claim 19, wherein the computer readable program code configured to select a data processing system comprises computer readable program code configured to select a data processing system to distribute workload between the potential target data processing systems.

21. The computer program product according to claim 19, wherein the distributing data processing system comprises a routing communication protocol stack.

22. A computer program product for communicating with a plurality of application instances executing on a cluster of data processing systems utilizing a single Internet Protocol (IP) address, comprising:
- a computer readable storage media having computer readable program code embodied therein, the computer readable program code comprising;
- computer readable program code configured to notify a distributing data processing system if an application opens a listening socket utilizing any port associated with the single IP address;
- computer readable program code configured to identify potential target data processing systems in the cluster of data processing systems at the distributing data processing system based on the notification;
- computer readable program code configured to receive a request to establish a connection to the single IP address and a port associated with the single IP address at the distributing data processing system;
- computer readable program code configured to select a data processing system from the potential target data processing systems if the port associated with the request is associated with a potential data processing system;
- computer readable program code configured to route communications for the connection to the selected data processing system;
- computer readable program code configured to notify a distributing data processing system if an application opens a listening socket utilizing an enumerated port if ports associated with the single IP address are enumerated; and
- wherein the computer readable program code configured to notify the distributing data processing system if an application opens a listening socket utilizing any port associated with the single IP address comprises computer readable program code configured to notify the distributing data processing system if an application opens a listening socket utilizing any port associated with the single IP address if ports are not enumerated.

23. A computer program product for communicating with a plurality of application instances executing on a cluster of data processing systems utilizing a single Internet Protocol (IP) address, comprising:
- a computer readable storage media having computer readable program code embodied therein, the computer readable program code comprising;
- computer readable program code configured to notify a distributing data processing system if an application opens a listening socket utilizing any port associated with the single IP address;
- computer readable program code configured to identify potential target data processing systems in the cluster of data processing systems at the distributing data processing system based on the notification;
- computer readable program code configured to receive a request to establish a connection to the single IP address and a port associated with the single IP address at the distributing data processing system;
- computer readable program code configured to select a data processing system from the potential target data processing systems if the port associated with the request is associated with a potential data processing system;
- computer readable program code configured to route communications for the connection to the selected data processing system;
- computer readable program code configured to notify a distributing data processing system if an application opens a listening socket utilizing an enumerated port of the single IP address if ports associated with the single IP address are enumerated irrespective of whether the listening socket is opened with the single IP address specifically identified; and
- wherein the computer readable program code configured to notify the distributing data processing system if an application opens a listening socket utilizing any port associated with the single IP address comprises computer readable program code configured to notify the distributing data processing system if an application opens a listening socket utilizing any port associated with the single IP address if the listening socket is opened with the single IP address specifically identified.

24. The computer program product according to claim 23, further comprising:
- computer readable program code configured to receive at the data processing system in the cluster of data processing systems a definition that the single IP address is a distributed address from the distributing data processing system, wherein the definition includes an indication of whether ports associated with the single LP address which are to be distributed are enumerated; and computer readable program code configured to evaluate the definition to determine if the ports associated with the single IP address are enumerated.

25. A computer program product for communicating with a plurality of application instances executing on a cluster of data processing systems utilizing a single Internet Protocol (IP) address, comprising:

a computer readable storage media having computer readable program code embodied therein, the computer readable program code comprising;

computer readable program code configured to notify a distributing data processing system if an application opens a listening socket utilizing any port associated with the single IP address;

computer readable program code configured to identify potential target data processing systems in the cluster of data processing systems at the distributing data processing system based on the notification;

computer readable program code configured to receive a request to establish a connection to the single IP address and a port associated with the single IP address at the distributing data processing system;

computer readable program code configured to select a data processing system from the potential target data processing systems if the port associated with the request is associated with a potential data processing system;

computer readable program code configured to route communications for the connection to the selected data processing system;

computer readable program code configured to determine if a port associated with the received request is a unique port associated with a listening socket of an application on a data processing system within the cluster has a port associated;

computer readable program code configured to select the data processing system associated with the unique port as a destination data processing system for the request; and computer readable program code configured to route the request to the destination data processing system.

26. The computer program product according to claim 25, wherein the computer readable program code configured to determine if a port associated with the received request is a unique port comprises:

computer readable program code configured to notify the distributing data processing system if an application associated with a data processing system in the cluster of data processing systems opens a listening socket associated with the single IP address utilizing a unique port within the cluster of data processing systems so as to provide an identification of data processing systems associated with unique ports of the IP address; and computer readable program code configured to determine if the port associated with the received request is a unique port associated with an identified data processing system.

27. The computer program product according to claim 25, wherein the unique port comprises an ephemeral port.

* * * * *

UNITED STATES PATENT AND TRADEMARK OFFICE
CERTIFICATE OF CORRECTION

| | | |
|---|---|---|
| PATENT NO. | : 6,954,784 B2 | Page 1 of 1 |
| APPLICATION NO. | : 10/087853 | |
| DATED | : October 11, 2005 | |
| INVENTOR(S) | : Aiken, Jr. et al. | |

It is certified that error appears in the above-identified patent and that said Letters Patent is hereby corrected as shown below:

On the Title Page,
Section 54, Line 1 should read -- SYSTEMS, METHODS AND COMPUTER --

Column 1,
Line 1 should read -- SYSTEMS, METHODS AND COMPUTER --

Column 32
Line 66 should read -- IP address which are to be distributed are enumerated; --

Signed and Sealed this

Nineteenth Day of September, 2006

JON W. DUDAS
*Director of the United States Patent and Trademark Office*